(12) United States Patent
Torazawa

(10) Patent No.: US 10,179,698 B2
(45) Date of Patent: Jan. 15, 2019

(54) TRANSFER DEVICE AND METHOD OF CONTROLLING TRANSFER DEVICE

(71) Applicant: MURATA MACHINERY, LTD., Kyoto-shi, Kyoto (JP)

(72) Inventor: Masayoshi Torazawa, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 80 days.

(21) Appl. No.: 15/256,816

(22) Filed: Sep. 6, 2016

(65) Prior Publication Data

US 2017/0066591 A1    Mar. 9, 2017

(30) Foreign Application Priority Data

Sep. 8, 2015 (JP) ................................. 2015-176823
Sep. 8, 2015 (JP) ................................. 2015-177002
Sep. 8, 2015 (JP) ................................. 2015-177003

(51) Int. Cl.
  *B65G 1/04*    (2006.01)
(52) U.S. Cl.
  CPC .................................. *B65G 1/0435* (2013.01)
(58) Field of Classification Search
  CPC .... B65G 1/0435; B65G 1/0464; B65G 67/00; B25J 15/0047; B25J 15/0014
  See application file for complete search history.

(56) References Cited

U.S. PATENT DOCUMENTS

| 3,809,259 | A | * | 5/1974 | Pipes | B65G 1/0435 414/280 |
| 3,999,823 | A | * | 12/1976 | Di Liddo | B65G 1/0435 312/268 |
| 4,007,846 | A | * | 2/1977 | Pipes | B65G 1/0435 414/280 |
| 5,199,840 | A | * | 4/1993 | Castaldi | B65G 1/0435 198/469.1 |
| 5,564,880 | A | * | 10/1996 | Lederer | B65G 1/0435 414/280 |
| 5,833,427 | A | * | 11/1998 | Siegler | B65G 1/0435 414/277 |
| 9,469,492 | B2 | * | 10/2016 | Kashihara | B65G 67/00 |
| 2003/0091411 | A1 | * | 5/2003 | Diehm | B65G 1/0435 414/280 |

(Continued)

FOREIGN PATENT DOCUMENTS

JP    53-136779 U    4/1977
JP    61-185708 U    11/1986
(Continued)

*Primary Examiner* — Kaitlin S Joerger
(74) *Attorney, Agent, or Firm* — Keating & Bennett, LLP

(57) ABSTRACT

A transfer device includes a first engaging member to be inserted between a first engagement receiving portion, which is spaced away from a first surface portion of an article toward an outside in a transfer direction by a predetermined distance, and the first surface portion, due to rotation of the first engaging member about a first axis of rotation along the transfer direction. The first engaging member includes a first push-up portion which lifts the first surface portion by making contact with a first jaw portion in a state in which the first jaw portion protrudes toward the outside from the first surface portion.

12 Claims, 19 Drawing Sheets

(56) References Cited

U.S. PATENT DOCUMENTS

| | | | |
|---|---|---|---|
| 2007/0135961 A1* | 6/2007 | Ishida | B65G 1/0435 700/213 |
| 2009/0196720 A1* | 8/2009 | Kostmann | B65G 1/0435 414/331.01 |
| 2013/0078064 A1* | 3/2013 | Kostmann | B65G 1/0435 414/277 |
| 2017/0066591 A1* | 3/2017 | Torazawa | B65G 1/0435 |

FOREIGN PATENT DOCUMENTS

| | | |
|---|---|---|
| JP | 63-031908 A | 2/1988 |
| JP | 02-081812 A | 3/1990 |
| JP | 2-88905 U | 7/1990 |
| JP | 11-208844 A | 8/1999 |
| JP | 2001-328703 A | 11/2001 |
| JP | 2004-342680 A | 12/2004 |
| JP | 2006-052064 A | 2/2006 |

* cited by examiner

TRANSFER DEVICE AND METHOD OF CONTROLLING TRANSFER DEVICE

BACKGROUND OF THE INVENTION

1. Field of the Invention

The present invention relates to a transfer device for use in transferring an article by making the article slide between a first holding section and a second holding section located in a vicinity of the first holding section.

2. Description of the Related Art

Automated warehouses have been used in a field of commodity distribution. Such an automated warehouse includes: storage shelves which can store articles by arranging the articles in a vertical direction and in a lateral direction; a conveyance device such as a stacker crane which holds and conveys articles transferred between the storage shelves and the conveyance device; and a transfer device mounted on the conveyance device.

In such automated warehouses, there has been a demand for the enhancement of storage efficiency. As one way to enhance storage efficiency, a following technique is proposed in JP-A-2001-328703. That is, JP-A-2001-328703 proposes a technique in which a hook is engaged with a first engagement receiving portion formed on a front surface of an article stored in a storage shelf, and the article is towed to a conveyance device side by moving the hook in a transfer direction, thus carrying out the article from the storage shelf. JP-A-2001-328703 also discloses a technique in which an article is carried in the storage shelf by pushing the front surface of the article held on the conveyance device.

By adopting such a technique, it is unnecessary to insert an arm between articles held in a juxtaposed manner and hence, even when articles which are densely disposed in a vertical direction as well as in a lateral direction can be carried out or carried in and hence, storage efficiency of an automated warehouse is enhanced.

In the conventional technique, however, the article is towed from the storage shelf by engaging the hook with the first engagement receiving portion on the front surface of the article and hence, the article is transferred by making the article slide on a shelf plate or the like. Accordingly, when a protrusion or the like is provided on the shelf plate to prevent falling of an article due to swinging generated by an earthquake or the like, the article is brought into contact with the protrusion such that the transfer of the article is obstructed.

SUMMARY OF THE INVENTION

Preferred embodiments of the present invention provide a transfer device which transfers an article while avoiding a protrusion that prevents falling with a simple configuration even when the transfer device is of a type which transfers the article by making the article slide on a shelf plate while maintaining high storage efficiency of an automated warehouse.

A transfer device according to a preferred embodiment of the present invention includes a second holding section that holds an article transferred by sliding the article between the second holding section and a first holding section, wherein the article includes a first engagement receiving portion disposed in a state where the first engagement receiving portion is located away from a first surface portion on a plane intersecting with a transfer direction toward an outside in the transfer direction by a predetermined distance, the transfer device includes a first engaging member to be inserted between the first engagement receiving portion and the first surface portion of the article due to rotation of the first engaging member about a first axis of rotation along the transfer direction, and the first engaging member includes a first push-up portion disposed at a position where the first push-up portion has a radius of rotation longer than a distance between the first axis of rotation and a lower end portion of a first jaw portion provided to the article in a state where the first jaw portion protrudes toward the outside from the first surface portion, the first push-up portion lifting the first surface portion of the article by making contact with the first jaw portion.

With such a configuration, the first surface portion of the article is able to be lifted by using a force to rotate the first engaging member so as to make the first engaging member engage with the first engagement receiving portion. Accordingly, it is unnecessary to additionally provide a lifting mechanism to lift the first surface portion of the article. It is also unnecessary to control raising and lowering of the transfer device. Accordingly, it is possible to transfer the article by sliding the article while allowing the article to avoid contact with the protrusion that prevents falling of the article with a simple structure.

A transfer device according to a preferred embodiment of the present invention may further include a second engaging member that rotates about a second axis of rotation disposed along the transfer direction, wherein the first engaging member may include a first pressing portion which is pressed to a side end portion of a first wall portion provided to the article in a state where the first wall portion protrudes toward the outside from the first surface portion in a width direction of the article due to rotation of the first engaging member, and the second engaging member may include a second pressing portion which is pressed to a side end portion of a second wall portion provided to the article in a state where the second wall portion protrudes toward the outside from the first surface portion in a direction opposite to the first pressing portion in a width direction of the article due to rotation of the second engaging member.

With such a configuration, during a period where the article is transferred, rattling of the article in a width direction intersecting with a transfer direction is significantly reduced or prevented. Further, by strongly pressing the first pressing portion and the second pressing portion to the first wall portion and the second wall portion, it is also possible to perform centering of the article at a predetermined position in the width direction.

The first engaging member may include a first regulation receiving portion which engages with an upper end portion of a first regulating portion provided to the article in a state where the first regulating portion protrudes toward the outside from the first surface portion and regulates movement of the first surface portion in an upward direction.

With such a configuration, during a period where the article is transferred, rattling of the article in a vertical direction is significantly reduced or prevented. Accordingly, it is possible to prevent the occurrence of a phenomenon that the engagement between the first engaging member and the first engagement receiving portion is inadvertently released.

Further, a transfer device according to a preferred embodiment of the present invention includes a second holding section to hold an article transferred by sliding between the second holding section and a first holding section, wherein the article includes a first engagement receiving portion disposed in a state where the first engagement receiving portion is located away from a first surface portion on a plane intersecting with a transfer direction toward an outside in the transfer direction by a predetermined distance, the transfer device includes a third engaging member to be inserted between the first engagement receiving portion and the first surface portion of the article due to rotation of the third engaging member about a third axis of rotation along a width direction of the article at a position spaced away from the third axis of rotation, and the third engaging member extends along the third axis of rotation, the third engaging member lifting the first surface portion of the article by making contact with a lower end portion of a first jaw portion provided to the article in a state where the first jaw portion protrudes toward the outside from the first surface portion.

With such a configuration, it is possible to lift the first surface portion of the article by using a force which rotates the third engaging member to engage with the first engagement receiving portion. Therefore, it is unnecessary to additionally provide a mechanism to lift the first surface portion of the article. It is also unnecessary to control raising and lowering of the transfer device. Accordingly, it is possible to transfer the article by sliding the article while allowing the article to avoid contact with the protrusion that prevents falling of the article with a simple structure.

A transfer device according to a preferred embodiment of the present invention includes a second holding section that holds an article transferred by sliding between the second holding section and a first holding section, wherein the article includes a first engagement receiving portion and a second engagement receiving portion which are disposed in a state where the first engagement receiving portion and the second engagement receiving portion are located away from a first surface portion on a plane intersecting with a transfer direction toward an outside in the transfer direction by a predetermined distance, the transfer device includes a fourth engaging member to be inserted between the first engagement receiving portion and the first surface portion of the article due to rotation of the fourth engaging member about a fourth axis of rotation along a vertical direction at a position spaced away from the fourth axis of rotation, the transfer device includes a fifth engaging member to be inserted between the second engagement receiving portion and the first surface portion of the article due to rotation of the fifth engaging member in a direction opposite to the rotation of the fourth engaging member about a fifth axis of rotation along the vertical direction at a position spaced away from the fifth axis of rotation, the fourth engaging member and the fifth engaging member extend along the fourth axis of rotation and the fifth axis of rotation respectively in an upwardly protruding state, and the fourth engaging member and the fifth engaging member lift the first surface portion of the article by bringing a lower end portion of a first jaw portion and a lower end portion of a second jaw portion into contact with upper end portions of the fourth engaging member and the fifth engaging member, respectively, the lower end portion of the first jaw portion being provided to the article in a state where the first jaw portion protrudes toward the outside from the first surface portion and having a lower end inclined in a width direction of the article, and the lower end portion of the second jaw portion being provided to the article in a state where the second jaw portion protrudes toward the outside from the first surface portion and having a lower end inclined in a direction opposite to an inclined direction of the first jaw portion.

With such a configuration, it is possible to lift the first surface portion of the article by using a force which rotates the fourth engaging member and the fifth engaging member to engage with the first engagement receiving portion. Therefore, it is unnecessary to additionally provide a mechanism to lift the first surface portion of the article. It is also unnecessary to control raising and lowering of the transfer device. Accordingly, it is possible to transfer the article by sliding the article while allowing the article to avoid contact with the protrusion that prevents falling of the article with a simple structure.

The transfer device may further include a contact member disposed on an article side of the first engaging member, the contact member rotating in an interlocked manner with an operation of the first engaging member about the first axis of rotation, and to stop between a position below the article and a position where the first engaging member is inserted between the first engagement receiving portion and the first surface portion.

With such a configuration, by causing the contact member whose rotation is stopped to make contact with the first surface portion, the positioning between the first engagement receiving portion and the first engaging member is able to be performed accurately. Accordingly, even when a gap between the first surface portion and the first engagement receiving portion is narrow, the first engaging member is able to be easily inserted into the gap. Further, after the positioning of the contact member is finished, the first engaging member is able to be rotated while maintaining the position of the contact member and hence, the first engaging member is able to be inserted into the gap without being rubbed against the article. Accordingly, the generation of dust and the occurrence of damage to the article is significantly reduced or prevented.

The transfer device may further include an urging member which urges both the first engaging member and the contact member toward the article side along the axis of rotation.

With such a configuration, even when an unexpected displacement occurs in the article, the contact member is brought into contact with the article and hence, the urging member absorbs the displacement. Accordingly, it is possible to accurately insert the first engaging member into the gap.

The contact member may have a shape including an upper end edge of the contact member extending horizontally when the contact member is stopped between the position below the article and the position where the first engaging member is inserted between the first engagement receiving portion and the first surface portion.

With such a configuration, even when the article has an inversed truncated cone shape so that the first surface portion of the article is inclined, the contact member and the first surface portion are brought into contact with each other in a line shape or in an elongated surface shape. Accordingly, a contact pressure is able to be dispersed so that damage to the first surface portion is significantly reduced or prevented.

In a state where the contact member is stopped, the contact member may be pressed to the article so as to further rotate the first engaging member.

With such a configuration, damage to the article is significantly reduced or prevented as much as possible.

The transfer device may further include an extensible resilient member which connects the first engaging member and the contact member to each other.

With such a configuration, the contact member is able to be rotated in an interlocked state with the rotation of the first engaging member with a simple configuration. Further, even after the rotation of the contact member is stopped at a predetermined position, the first engaging member is able to be rotated.

The transfer device may further include a stopper that stops the contact member which rotates in an interlocked state with the operation of the first engaging member.

The transfer device may further include a rotation driver that rotatably swings the first engaging member; a transfer driver that moves back and forth the first engaging member in the transfer direction; and a controller configured or programmed to perform a control in which, in transferring an article held on the second holding section to the first holding section, the first engaging member is disposed at a position spaced away from the first surface portion on a side opposite to the first holding section with respect to the article by controlling the transfer driver, the first engaging member is caused to protrude to a position where the first engaging member is not engaged with the first engagement receiving portion by controlling the rotation driver, and the first engaging member is brought into contact with the first surface portion by controlling the transfer driver.

With such a configuration, even when unexpected displacement occurs in the article, by arranging the first engaging member at the position where the first engaging member does not interfere with the article, and by bringing the first engaging member and the first surface portion into contact with each other after rotating the first engaging member to the position where the first engaging member does not interfere with the first engagement receiving portion and can interfere with the first surface portion of the article, it is possible to accurately set the positional relationship between the first engaging member and the first engagement receiving portion. Accordingly, by further rotating the first engaging member in such a state, it is possible to easily bring the first engaging member and the first engagement receiving portion into an engaged state. Accordingly, it is possible to smoothly transfer the article from the second holding section to the first holding section.

The transfer device may further include an urging member that urges the first engaging member toward an article side along the first axis of rotation.

With such a configuration, the contact member is brought into contact with the article so that the urging member absorbs unexpected displacement of the article. Accordingly, it is possible to insert the first engaging member into the gap between the first surface portion and the first engagement receiving portion with high accuracy without imparting a strong impact to the article.

The transfer device may further include a contact member disposed on an article side of the first engaging member, the contact member being able to rotate in an interlocked state with an operation of the first engaging member about the first axis of rotation, and to stop between a position below the article and a position where the first engaging member is inserted between the first engagement receiving portion and the first surface portion.

With such a configuration, by bringing the contact member whose rotation is stopped into contact with the first surface portion, the positioning between the first engagement receiving portion and the first engaging member is able to be performed accurately. Accordingly, even when a gap between the first surface portion and the first engagement receiving portion is narrow, the first engaging member is able to be easily inserted into the gap. Further, the first engaging member is able to be rotated while maintaining the position of the contact member and hence, the first engaging member is able to be inserted into the gap without being rubbed against the article. Accordingly, the generation of dust and the occurrence of damage to the article is significantly reduced or prevented.

Further, according to a preferred embodiment of the present invention, a method of controlling a transfer device which includes a second holding section that holds an article which is transferred by sliding the article between the second holding section and a first holding section; a transfer member to be inserted, due to rotation of the transfer member about an axis of rotation along a transfer direction, between an engagement receiving portion, which is provided to the article in a state in which the engagement receiving portion is located away from a first surface portion on a plane intersecting with a transfer direction of the article and the first surface portion toward an outside in the transfer direction by a predetermined distance, and the first surface portion; a rotation driver to rotatably swing the transfer member; and a transfer driver that moves back and forth the transfer member in the transfer direction, the method including the steps of, in transferring the article held on the second holding section to the first holding section, arranging the transfer member at a position spaced away from the first surface portion on a side opposite to the first holding section with respect to the article by controlling the transfer driver; causing the transfer member to protrude to a position where the transfer member is not engaged with the engagement receiving portion by controlling the rotation driver; and bringing the transfer member into contact with the first surface portion by controlling the transfer driver.

With such a configuration, even when unexpected displacement occurs in the article, by arranging the transfer member at the position where the transfer member does not interfere with the article, and by bringing the transfer member and the first surface portion into contact with each other after rotating the transfer member to the position where the transfer member does not interfere with the engagement receiving portion and can interfere with the first surface portion of the article, it is possible to accurately set the positional relationship between the transfer member and the engagement receiving portion. Accordingly, by further rotating the transfer member in such a state, it is possible to easily bring the transfer member and the engagement receiving portion into an engageable state. Accordingly, it is possible to smoothly transfer the article from the second holding section to the first holding section.

According to another preferred embodiment of the present invention, a non-transitory computer-readable medium includes a program that causes a computer to execute various processing including the above-mentioned method of controlling a transfer device.

According to preferred embodiments of the present invention, it is possible to transfer an article in a storage shelf which achieves high article storage density and is provided with a protrusion that prevents falling of the article with a simple configuration.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a perspective view illustrating engaging members, contact members and the like.

DETAILED DESCRIPTION OF THE PREFERRED EMBODIMENTS

Figure 1A:
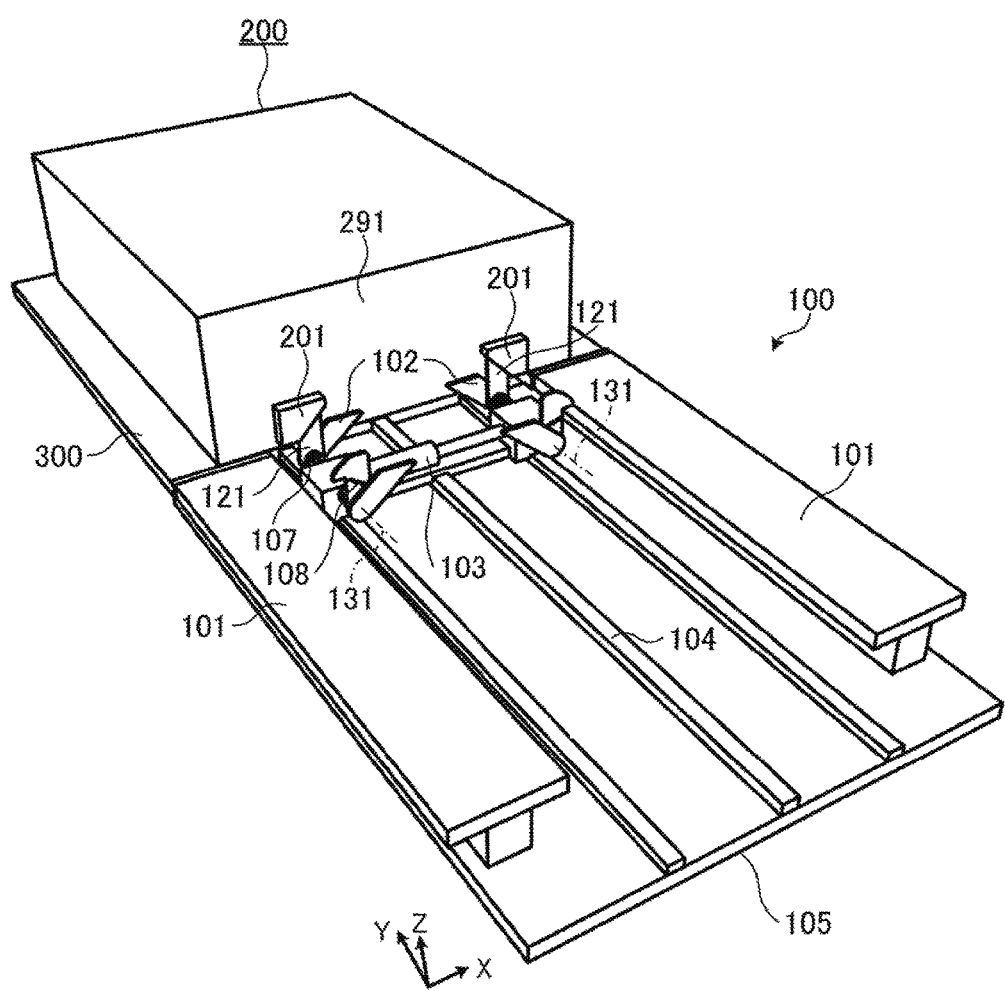
FIG. 1A is a perspective view illustrating a transfer device together with an article and a first holding section.

Transfer devices according to preferred embodiments of the present invention are described with reference to drawings. The preferred embodiments described hereinafter merely exemplify examples of transfer devices according to the present invention. Accordingly, the scope of the present invention is defined by the claims with reference to the preferred embodiments described hereinafter, and the present invention is not limited only to the preferred embodiments described hereinafter.

The drawings are schematic drawings where emphasis, omission and adjustment of ratios are suitably made for facilitating the understanding of preferred embodiments of the present invention. Accordingly, shapes, positional relationships and ratios of elements and features shown in the drawings may differ from shapes, positional relationships and ratios of actual constitutional elements.

First Preferred Embodiment

FIG. 1A is a perspective view illustrating a transfer device together with an article and a first holding section.

Figure 1B:
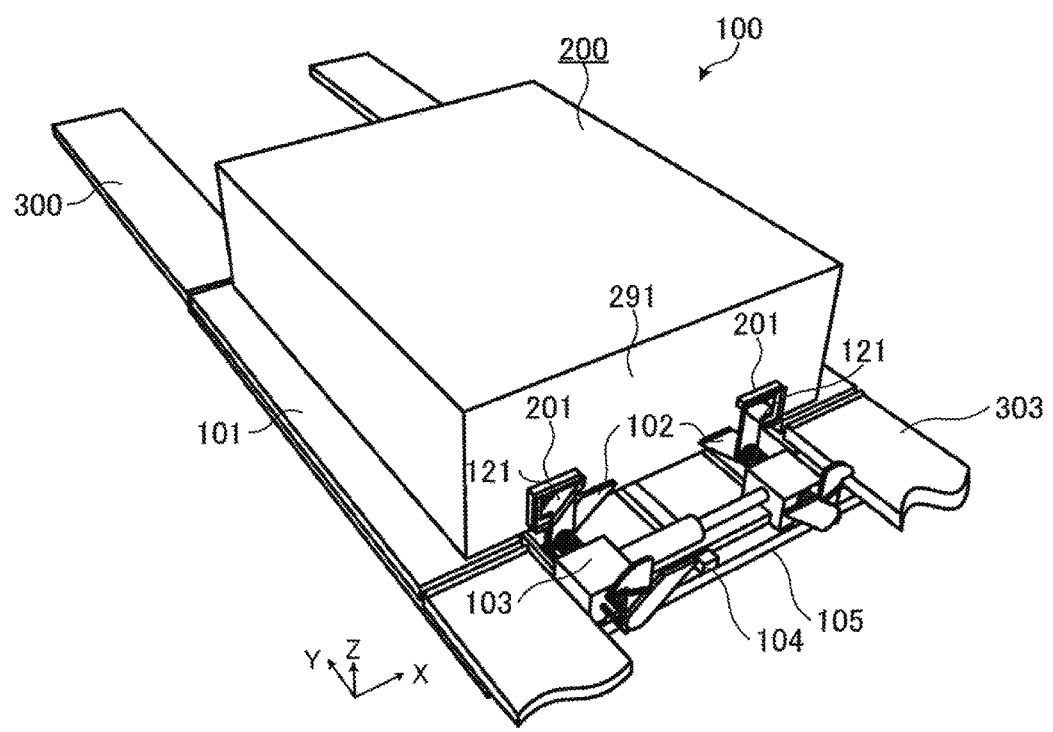
FIG. 1B is a perspective view illustrating the transfer device together with the article, the first holding section, and a third holding section.

FIG. 1B is a perspective view illustrating the transfer device together with the article, the first holding section, and a third holding section.

Figure 2:
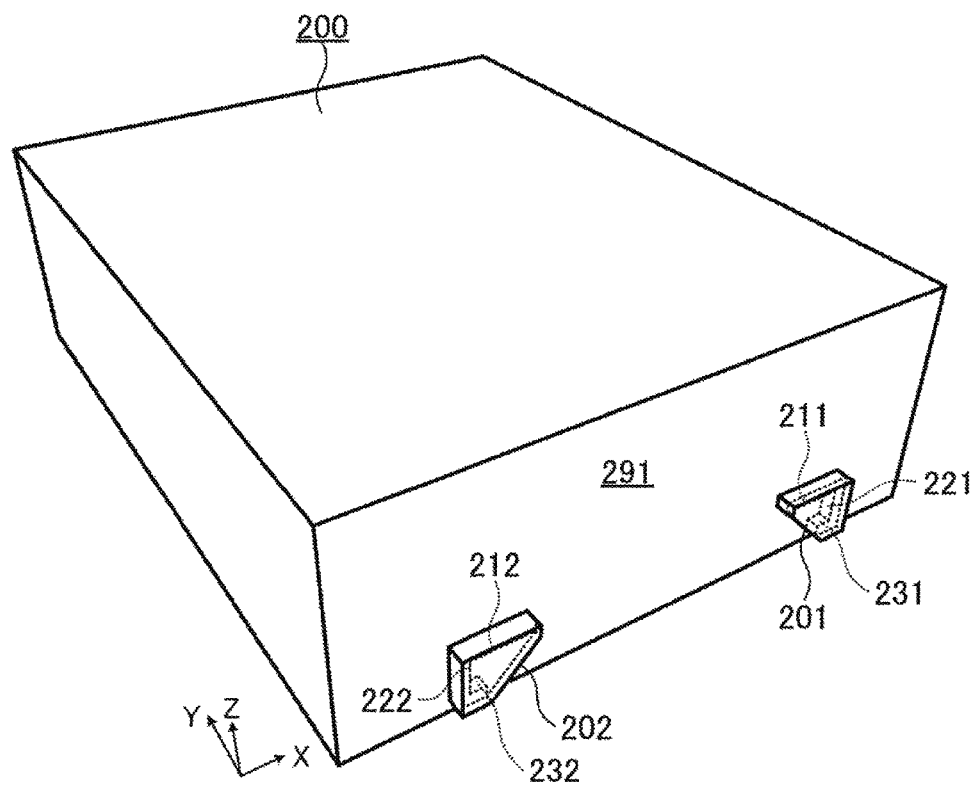
FIG. 2 is a perspective view illustrating the article.

FIG. 2 is a perspective view illustrating the article.

First, an article 200 which is an object to be transferred by a transfer device 100 is described.

The article 200 is an object which is held at a first holding section 300 or a third holding section 303, and is transferred between the first holding section 300 or the third holding section 303 and the transfer device 100. The article 200 includes portions which conform to the transfer device 100. The portions which conform to the transfer device 100 are a first engagement receiving portion 201 and a first jaw portion 211. In this preferred embodiment, the article 200 further includes a first wall portion 221 and a first regulating portion 231 as portions which conform to the transfer device 100. The article further includes a second engagement receiving portion 202, a second jaw portion 212, a second wall portion 222, and a second regulating portion 232.

The first engagement receiving portion 201 and the second engagement receiving portion 202 may be also collectively referred to as "engagement receiving portions". The first jaw portion 211 and the second jaw portion 212 may be also collectively referred to as "jaw portions". The first wall portion 221 and the second wall portion 222 may be also collectively referred to as "wall portions". The first regulating portion 231 and the second regulating portion 232 may be also collectively referred to as "regulating portions".

The first engagement receiving portion 201 is a portion which is provided to the article 200 in a state where the first engagement receiving portion 201 is located away from a first surface portion 291 on a plane intersecting with a transfer direction of the article 200 (Y axis direction in the drawing) toward the outside in the transfer direction (negative direction in the Y axis direction in the drawing) by a predetermined distance. The first engagement receiving portion 201 is a portion which engages with a first engaging member 121, to be described later, provided to the transfer device 100 in the transfer direction and to which a force for transferring the article 200 from the first engaging member 121 is imparted. In the case of this preferred embodiment, the first engagement receiving portion 201 is integrally mounted on a first surface portion 291 of the article 200 by way of the first jaw portion 211.

In this preferred embodiment, the article 200 also includes a second engagement receiving portion 202 which is disposed the first engagement receiving portion 201, and has substantially the same function as the first engagement receiving portion 201.

The first jaw portion 211 is a portion provided to the article 200 in a state where the first jaw portion 211 protrudes toward the outside from the first surface portion 291 of the article 200. The first jaw portion 211 is a portion which engages with a first push-up portion 141 (to be described later) of the first engaging member 121 in a vertical direction (Z axis direction in the drawing) and to which a force for pushing up the first surface portion 291 of the article 200 from the first engaging member 121 is imparted. The first jaw portion 211 includes a plate-shaped portion which protrudes perpendicular or substantially perpendicular to the first surface portion 291 and extends in a width direction (X axis direction in the drawing) of the article 200. A lower end portion of the first jaw portion 211 includes a lower end surface which expands along a horizontal plane.

In this preferred embodiment, the article 200 includes a second jaw portion 212 which is disposed in a plane that is symmetrical with the first jaw portion 211 in the same manner as the second engagement receiving portion 202.

The first wall portion 221 is a portion provided to the article 200 in a state where the first wall portion 221 protrudes toward the outside from the first surface portion 291 of the article 200. The first wall portion 221 is a portion to which a first pressing portion 151 of the first engaging member 121, to be described later, is pressed in a width direction (X axis direction in the drawing) of the article 200. The first wall portion 221 includes a plate-shaped portion which protrudes perpendicular or substantially perpendicular to the first surface portion 291 and extends in a vertical direction (Z axis direction in the drawing). A side end portion of the first wall portion 221 includes a side end surface which expands along a plane which is perpendicular or substantially perpendicular to the first surface portion 291 and includes a vertical axis.

In this preferred embodiment, the article 200 includes a second wall portion 222 disposed in a plane that is symmetrical with the first wall portion 221, and a side end surface of the first wall portion 221 and a side end surface of the second wall portion 222 are disposed opposite to each other. The second wall portion 222 is a portion to which a second pressing portion 152 of the second engaging member 122 is pressed. A force from the first engaging member 121 is received by the first wall portion 221 and a force from the second engaging member 122 is received by the second wall portion 222 so that centering of the article 200 is able to be performed.

The first regulating portion 231 is a portion provided to the article 200 in a state where the first regulating portion 231 protrudes toward the outside from the first surface portion 291. The first regulating portion 231 is a portion which engages with a first regulation receiving portion 161 of the first engaging member 121 (to be described later) in a vertical direction (Z axis direction in the drawing). The first regulating portion 231 includes a plate-shaped portion which protrudes perpendicular or substantially perpendicular to the first surface portion 291 and extends in a width direction (X axis direction in the drawing) of the article 200. The first regulating portion 231 is shorter than the first jaw portion 211 in a width direction. An upper end portion of the first regulating portion 231 has an upper end surface expanding along a horizontal plane. A force extending downward may be imparted to the first regulating portion 231 from the first regulation receiving portion 161.

In this preferred embodiment, the article 200 includes a second regulating portion 232 disposed in a plane that is symmetrical with the first regulating portion 231.

Figure 3:
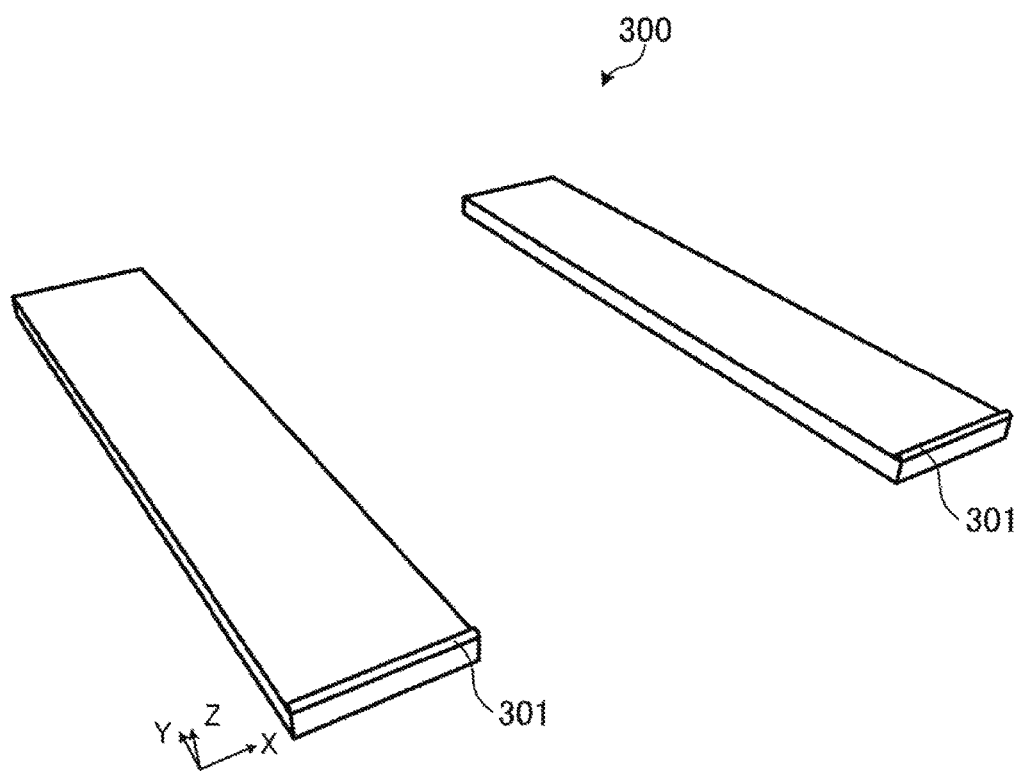
FIG. 3 is a perspective view illustrating the first holding section.

FIG. 3 is a perspective view illustrating the first holding section.

As illustrated in these drawings, the first holding section 300 is a structure that holds the article 200. In the case of this preferred embodiment, the first holding section 300 includes plate-shaped portions which hold the article 200 in a placed state. The first holding section 300 preferably holds both end portions of the article 200 in a width direction from below. The first holding section 300 is provided with stoppers 301 which prevent a phenomenon that the article 200 falls from the first holding section 300 due to vibrations generated by an earthquake or the like. The stoppers 301 are provided to end edge portions of the first holding section 300 on a transfer device 100 side in an upwardly protruding state.

The first holding section 300 defines a portion of a storage shelf (not illustrated). In the storage shelf, the first holding sections 300 are arranged in a plurality of stages in the vertical direction, and the first holding sections 300 are arranged in a plurality of rows also in a width direction of the article 200.

The third holding section 303 is disposed in a plane that is symmetrical with the first holding section 300 with the transfer device 100 sandwiched therebetween. The third holding section 303 also includes stoppers 301.

Next, the transfer device 100 is described.

As illustrated in FIG. 1A and FIG. 1B, the transfer device 100 transfers the article 200 to the first holding section 300 or the third holding section 303 by making the article 200 slide. For example, the transfer device 100 is mounted on a conveyance device (not illustrated) which can convey the article 200 such as a stacker crane or a traveling vehicle or the like. The transfer device 100 is movable to a position corresponding to the first holding section 300 or the third holding section 303 by the conveyance device. The transfer device 100 includes second holding sections 101, the first engaging member 121, the contact members 102, and a stop unit 106. In this preferred embodiment, the transfer device 100 further includes the second engaging member 122 and the contact members 102. The transfer device 100 further includes a rotation driver 103, a transfer driver 104, an urging member 107, a resilient member 108, and a controller 109 (to be described later).

The second holding sections 101 are structures that hold the article 200. In the case of this preferred embodiment, the second holding sections 101 are mounted above a base body 105 and on both ends of the base body 105 in a width direction (X axis direction in the drawing). The second holding sections 101 correspond to the first holding section 300, and include plate-shaped portions which hold the article 200 in a placed state. The second holding sections 101 are to hold both end portions of the article 200 in a width direction from below.

Figure 4:
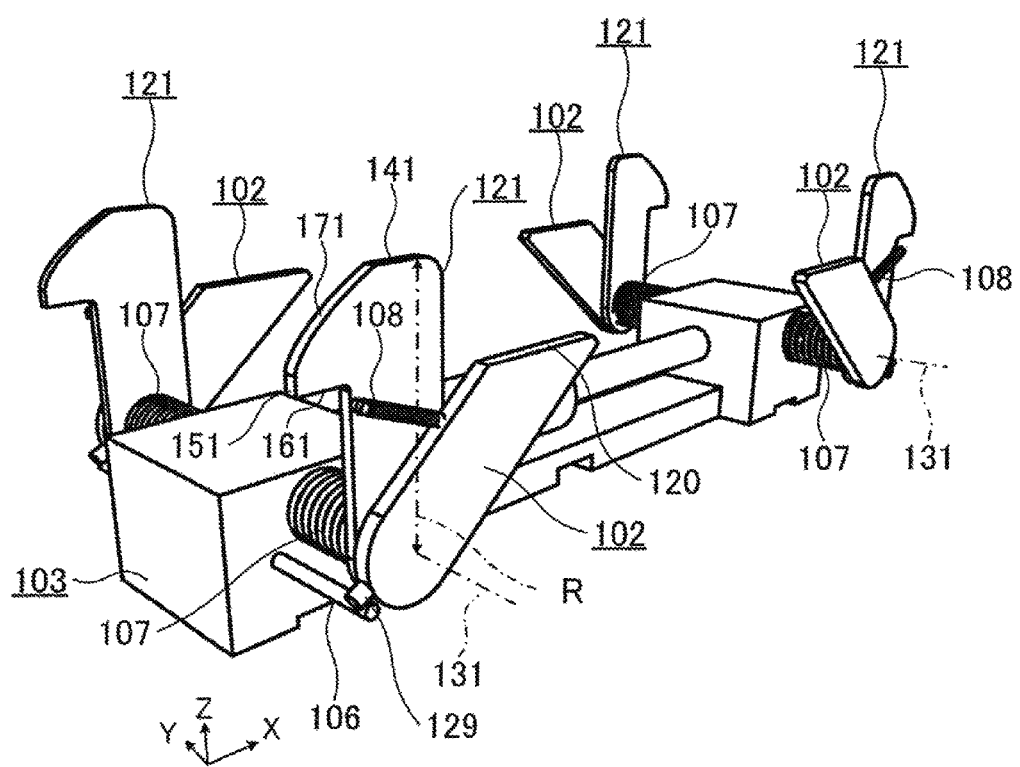

FIG. 4 is a perspective view illustrating first engaging member, the contact member, and the like.

Figure 5:
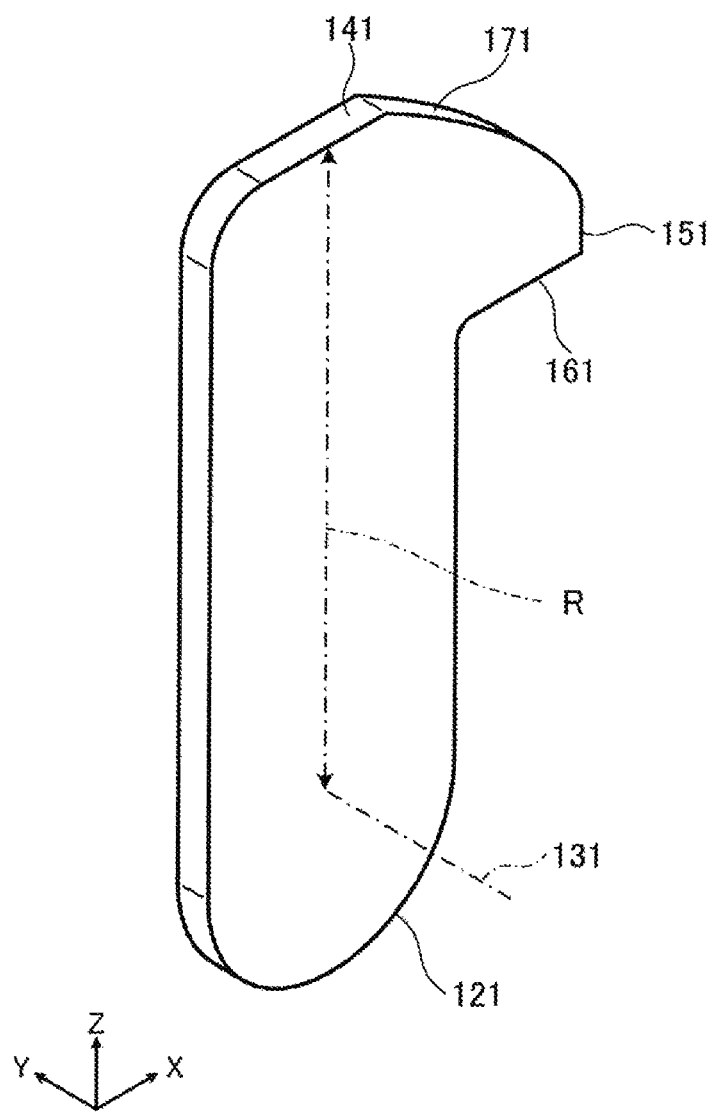
FIG. 5 is a perspective view illustrating a first engaging member.

FIG. 5 is a perspective view illustrating the first engaging member.

Figure 6:
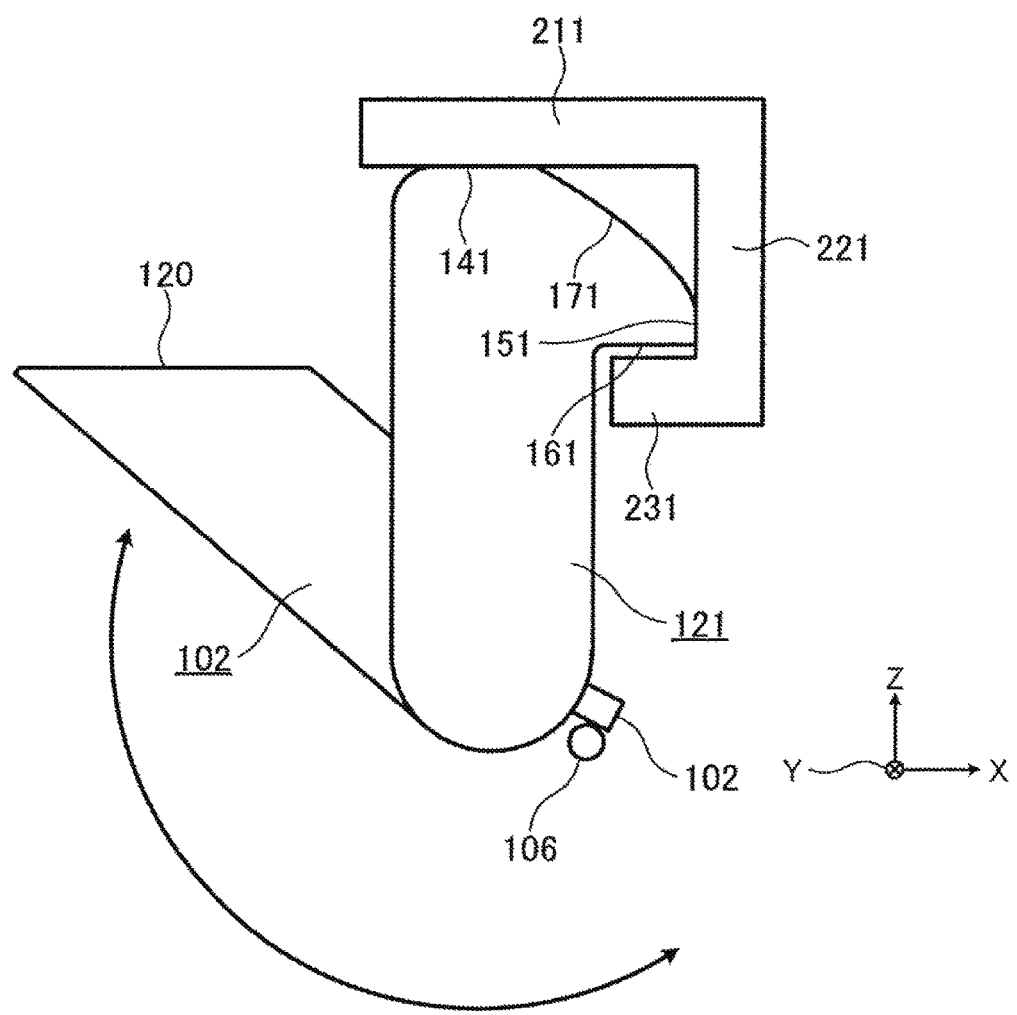
FIG. 6 is a plan view illustrating relationship between the engaging member, the contact member, and a portion of the article which conforms to the transfer device in a state where an engagement receiving portion is omitted.

FIG. 6 is a plan view illustrating relationship between the first engaging member and a portion of the article which conforms to the transfer device in a state where the first engagement receiving portion is omitted.

As illustrated in these drawings, the first engaging member 121 is a member which is inserted between the first surface portion 291 of the article 200 and the first engagement receiving portion 201 by rotating the first engaging member 121 about a first axis of rotation 131 along a transfer direction (Y axis direction in the drawing). The first engaging member 121 is a member which imparts a force for transferring the article 200 to the first engagement receiving portion 201. The first engaging member 121 includes a first push-up portion 141 which pushes up the first jaw portion 211. In the case of this preferred embodiment, the first engaging member 121 includes a first pressing portion 151, a first regulation receiving portion 161, and a first inclined portion 171.

Figure 10:
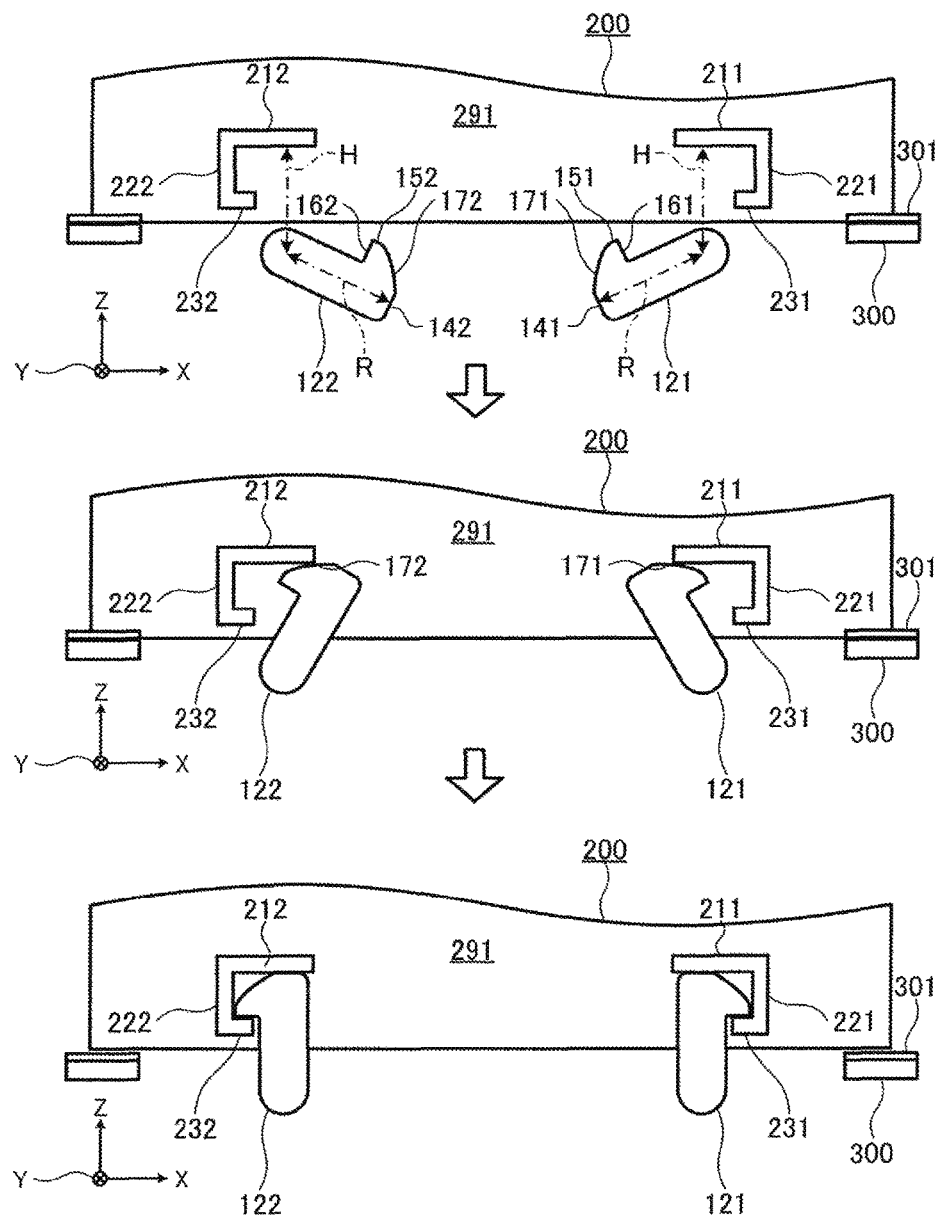
FIG. 10 is a view illustrating an operation of the transfer device in stages.

The first push-up portion 141 is a portion which imparts a force directed in an upward direction to the first jaw portion 211 provided to the article 200. The first push-up portion 141 is a portion provided at a position where the first push-up portion 141 has a radius of rotation R longer than a distance H between a lower end portion of the first jaw portion 211 of the article 200 and the first axis of rotation 131 (see FIG. 10) in a state where the article 200 is held on the first holding section 300 and the transfer device 100 is disposed at a position where the article 200 is able to be transferred between the first holding section 300 and the transfer device 100.

In the case of this preferred embodiment, the first push-up portion 141 preferably includes a flat surface so as to enable surface-contact with the first jaw portion 211. The first push-up portion 141 is a portion of a peripheral portion of the plate-shaped first engaging member 121.

The first pressing portion 151 is a portion which is pressed to a side end portion of the first wall portion 221 in a width direction of the article 200 due to rotation of the first engaging member 121. The first pressing portion 151 is bought into contact with the side end surface of the first wall portion 221 and imparts a force in the width direction of the article 200 in a state where the first push-up portion 141 is brought into contact with the first jaw portion 211 and lifts the first surface portion 291. Accordingly, when the article 200 is not disposed at a predetermined position in the width direction, the article 200 is able to be moved in the width direction due to a force from the first pressing portion 151.

The first regulation receiving portion 161 is a portion which engages with an upper end portion of the first regulating portion 231 and regulates the movement of the first surface portion 291 in an upward direction. The first regulation receiving portion 161 is a portion which is inserted between the first jaw portion 211 and the first regulating portion 231 in a state where the first push-up portion 141 is brought into contact with the first jaw portion 211 and lifts the first surface portion 291. Accordingly, when the first surface portion 291 is likely to be raised due to vibrations or the like exceeding a lifting amount of the first surface portion 291 by the first engaging member 121, the first regulation receiving portion 161 and the first regulating portion 231 engage with each other and hence, the further raising of the first surface portion 291 is prevented by the first regulation receiving portion 161. Further, the first regulation receiving portion 161 maintains a state where the first regulation receiving portion 161 is in contact with the first regulating portion 231 and hence, the first engaging member 121 is able to hold the first surface portion 291 of the article 200 in a fixed state.

The first inclined portion 171 is a portion where a radius of rotation is gradually shortened in a circumferential direction from the first push-up portion 141. The first inclined portion 171 includes a portion where a radius of rotation is shorter than a distance between a lower end portion of the first jaw portion 211 of the article 200 and the first axis of rotation 131 in a state where the article 200 is held on the first holding section 300 and the transfer device 100 is disposed at a position where the article 200 is able to be transferred between the first holding section 300 and the transfer device 100.

The first inclined portion 171 is a portion which, at the time of lifting the first surface portion 291 of the article 200, is brought into contact with the first jaw portion 211 prior to contacting of the first push-up portion 141 with the first jaw portion 211, and lifts the first surface portion 291 gradually along with the rotation of the first engaging member 121. More specifically, the first inclined portion 171 preferably has an arcuate shape which has the center at a position different from the first axis of rotation 131.

Figure 7:
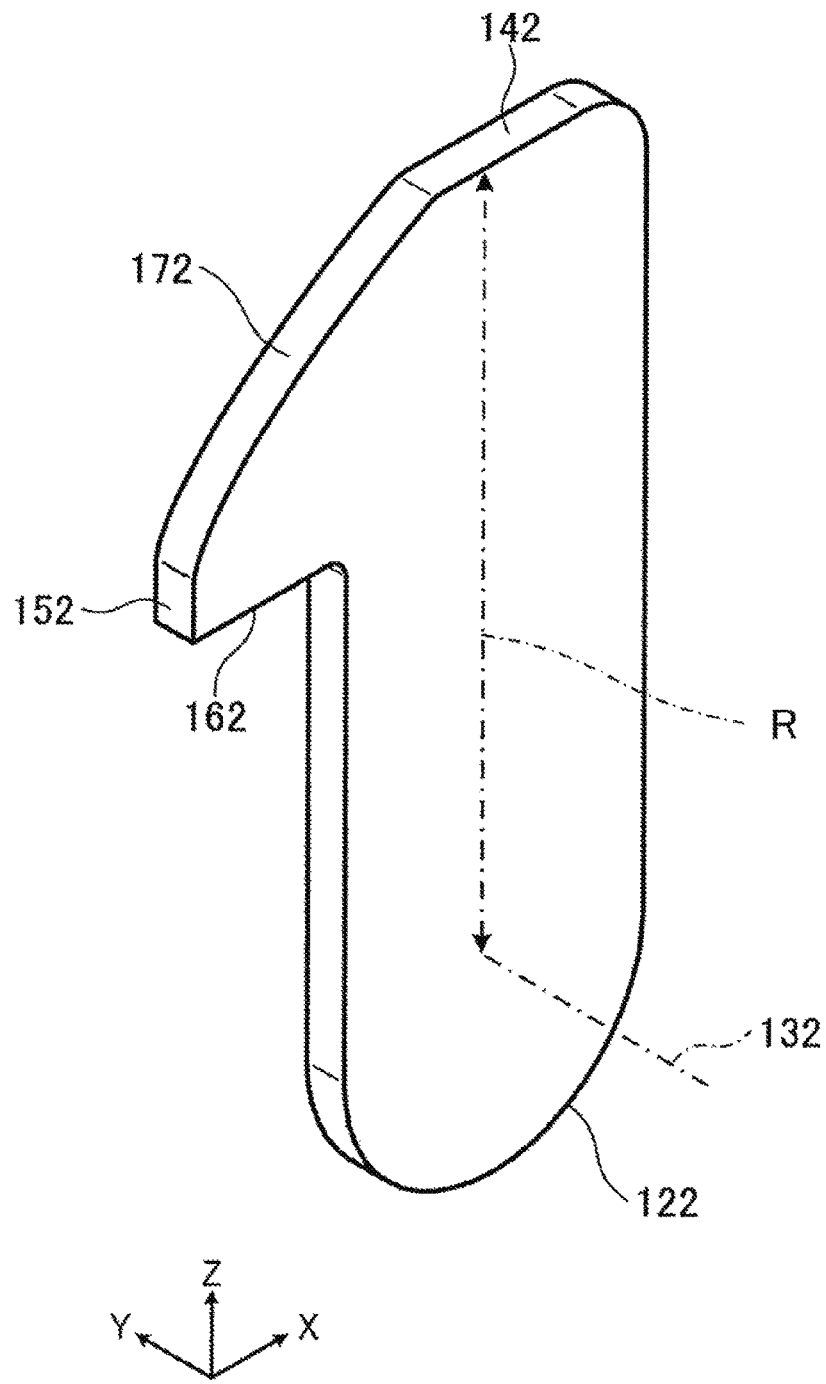
FIG. 7 is a perspective view illustrating a second engaging member.

FIG. 7 is a perspective view illustrating the second engaging member.

Figure 8:
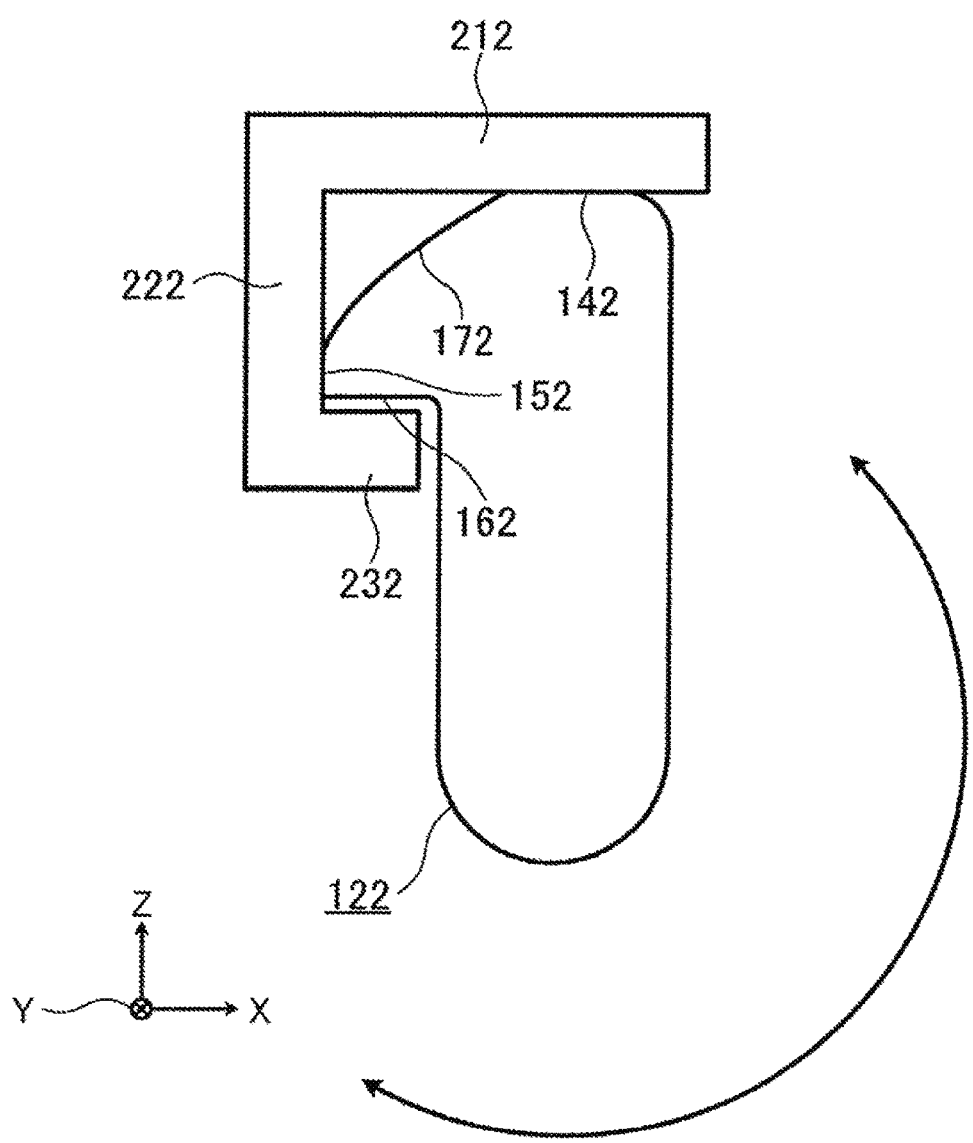
FIG. 8 is a plan view illustrating relationship between the second engaging member and a portion of the article which conforms to the transfer device in a state where a second engagement receiving portion is omitted.

FIG. 8 is a plan view illustrating relationship between the second engaging member and a portion of the article which conforms to the transfer device in a state where the second engagement receiving portion is omitted.

In the case of this preferred embodiment, the transfer device 100 includes the second engaging member 122 which is disposed in a plane that is symmetrical with the first engaging member 121. The second engaging member 122 is a member which is inserted between the first surface portion 291 of the article 200 and the second engagement receiving portion 202 by rotating the second engaging member 122 about a second axis of rotation 132 along a transfer direction (Y axis direction in the drawing). The second engaging member 122 is a member which imparts a force for transferring the article 200 to the second engagement receiving portion 202. The second engaging member 122 includes a second push-up portion 142, a second pressing portion 152, a second regulation receiving portion 162, and a second inclined portion 172.

The second pressing portion 152 is a portion which is pressed to a side end portion of the second wall portion 222 in a width direction of the article 200 due to rotation of the second engaging member 122 in a direction opposite to the pressing direction of the first pressing portion 151. The second push-up portion 142, the second regulation receiving portion 162 and the second inclined portion 172 have substantially the same functions as the first push-up portion 141, the first regulation receiving portion 161, and the first inclined portion 171 of the first engaging member 121 and hence, the description of these elements is omitted.

In the case of this preferred embodiment, the transfer device 100 includes two first engaging members 121 disposed parallel or substantially parallel to each other in the transfer direction and two second engaging members 122 disposed parallel or substantially parallel to each other in the transfer direction. With such a configuration, a total thickness (a length in the Z axis direction in the drawing) of the transfer device 100 is decreased.

The contact members 102 are members disposed on an article 200 side of the engaging members 121, 122, and are capable of rotating interlockingly with an operation of the engaging members 121, 122 about the axes of rotation 131, 132. The contact members 102 are members which are brought into contact with the first surface portion 291 of the article 200 in a state where the rotation of the contact members 102 is stopped by the stop units 106. The contact members 102 are members which impart a force for pushing the article 200 in transferring the article 200 to the first holding section 300 from the second holding section 101. In the case of this preferred embodiment, the contact member 102 includes a horizontal portion 120 whose upper end edge becomes horizontal in a state where the rotation of the contact member 102 is stopped by the stop unit 106. With the provision of the horizontal portion 120, an area of the contact member 102 where the contact member 102 is brought into contact with the article 200 is increased and hence, the occurrence of flaws or the like on the article 200 is significantly reduced or prevented.

Although the contact members 102 are mounted on the same shaft bodies as the engaging members 121, 122, the contact members 102 are not fixed to the shaft bodies and are mounted on the shaft bodies freely rotatable relative to the shaft bodies. In the case of this preferred embodiment, the contact members 102 are operated interlockingly with the engaging members 121, 122 with respect to the rotation in a protruding direction due to resilient members 108.

A shape of the upper end edge of the contact member 102 is not limited to a straight line shape disposed horizontally and may adopt any desired shape including an arcuate shape.

The resilient member 108 is an extensible member which connects the engaging members 121, 122 and the contact members 102 to each other. In the case of this preferred embodiment, the resilient member 108 includes a spring. When the engaging members 121, 122 are rotated in the protruding direction, the resilient members 108 transmit a rotational force to the contact members 102 so as to rotate the contact members 102. On the other hand, when the contact members 102 are stopped by the stop units 106, due to the engaging members 121, 122, the resilient members 108 are deformed until the engaging members 121, 122 are stopped. That is, with the provision of the resilient members 108, the contact members 102 rotate interlockingly with the engaging members 121, 122 until the contact members 102 reach a predetermined position, and only the engaging members 121, 122 are able to be rotated after the contact members 102 are stopped at the predetermined position. Further, when the engaging members 121, 122 are rotated in a retracting direction, the contact members 102 may be rotated interlockingly in the retracting direction by causing the resilient member 108 to push the contact members 102.

The interlocking operation between the engaging members 121, 122 and the contact members 102 is not limited to the case where the resilient members 108 are used, and may be provided by other methods such as a method which uses a friction as in the case of a clutch.

The stop unit 106 is a unit which stops the rotation of the contact member 102 between a retracted state of being positioned below the article 200 and a protruding state where the engaging members 121, 122 are inserted between the engagement receiving portions 201, 202 and the first surface portion 291. In the case of this preferred embodiment, the stop unit 106 includes a rod-shaped member mounted in a state where the stop unit 106 protrudes from the rotation driver 103. By bringing the stop unit 106 into contact with a stop portion 129 provided on the contact member 102, the rotation of the contact member 102 in the protruding direction is stopped. The stop unit 106 stops the rotation of the contact member 102 at a position where the horizontal portion 120 disposed on the upper end edge of the contact member 102 extends horizontally.

The stop unit 106 is not limited to a unit which mechanically stops the rotation of the contact member 102, and the stop unit 106 may adopt other stopping methods such as a method of stopping the rotation of the contact member 102 electromagnetically.

Further, the stop unit 106 may be disposed on an article 200 side.

The urging member 107 is a member which urges both the engaging members 121, 122 and the contact members 102 toward an article 200 side from a transfer device 100 side along the axes of rotation 131, 132. In the case of this preferred embodiment, the urging member 107 includes a helical spring. The urging member 107 is disposed in a state where the shaft body which rotates the engaging members 121, 122 is inserted into the urging member 107. The urging members 107 urge the engaging members 121, 122 and the contact members 102 toward the outside with respect to the rotation driver 103.

In the case of this preferred embodiment, the transfer device 100 includes two engaging members 121, 122 and two contact members 102 disposed in a row in a width direction orthogonal to a transfer direction, and the transfer device 100 includes two engaging members 121, 122 and two contact members 102 disposed in a row in the transfer direction. With such a configuration, a total thickness (a length in the Z axis direction in the drawing) of the transfer device 100 is decreased.

The rotation driver 103 can rotatably swing the first engaging member 121 about the first axis of rotation 131. In the case of this preferred embodiment, the rotation driver 103 is capable of rotatably swinging the second engaging member 122 about the second axis of rotation 132 simultaneously with the first engaging member 121. The rotation driver 103 drives the first engaging member 121 and the second engaging member 122 such that the movement of the first engaging member 121 and the movement of the second engaging member 122 become symmetrical with each other on a plane which expands at the center of the first axis of rotation 131 and the second axis of rotation 132 disposed parallel or substantially parallel to each other. The rotation driver 103 does not directly drive the contact member 102, but drives the contact members 102 by way of the first engaging members 121, 122. More specifically, the rotation driver 103 includes a motor having an axis of rotation thereof disposed in a direction intersecting with the first axis of rotation 131 and a second axis of rotation 132, a shaft which transmits a drive force of the motor, and a joint. By arranging the motor between the first engaging member 121 and the second engaging member 122, the above-mentioned operation in symmetry is able to be achieved.

The transfer driver 104 moves the first engaging member 121 and the contact member 102 back and forth in a transfer direction. The transfer driver 104 moves the article 200 back and forth in the transfer direction by way of the first engagement receiving portion 201 of the article 200, the first engaging member 121 which engages with the first surface portion 291, or the contact member 102 which engages with the first surface portion 291. In the case of this preferred embodiment, the transfer driver 104 moves the second engaging member 122 back and forth in a transfer direction simultaneously with the first engaging member 121 and the contact member 102. Along with such an operation, the rotation driver 103 is also moved back and forth. More specifically, the transfer driver 104 includes the first engaging member 121, the second engaging member 122, the contact member 102, rails which guide the rotation driver 103 in a transfer direction, and a linear drive unit which moves these elements back and forth.

Next, an operation of the transfer device 100 is described.

Figure 11:
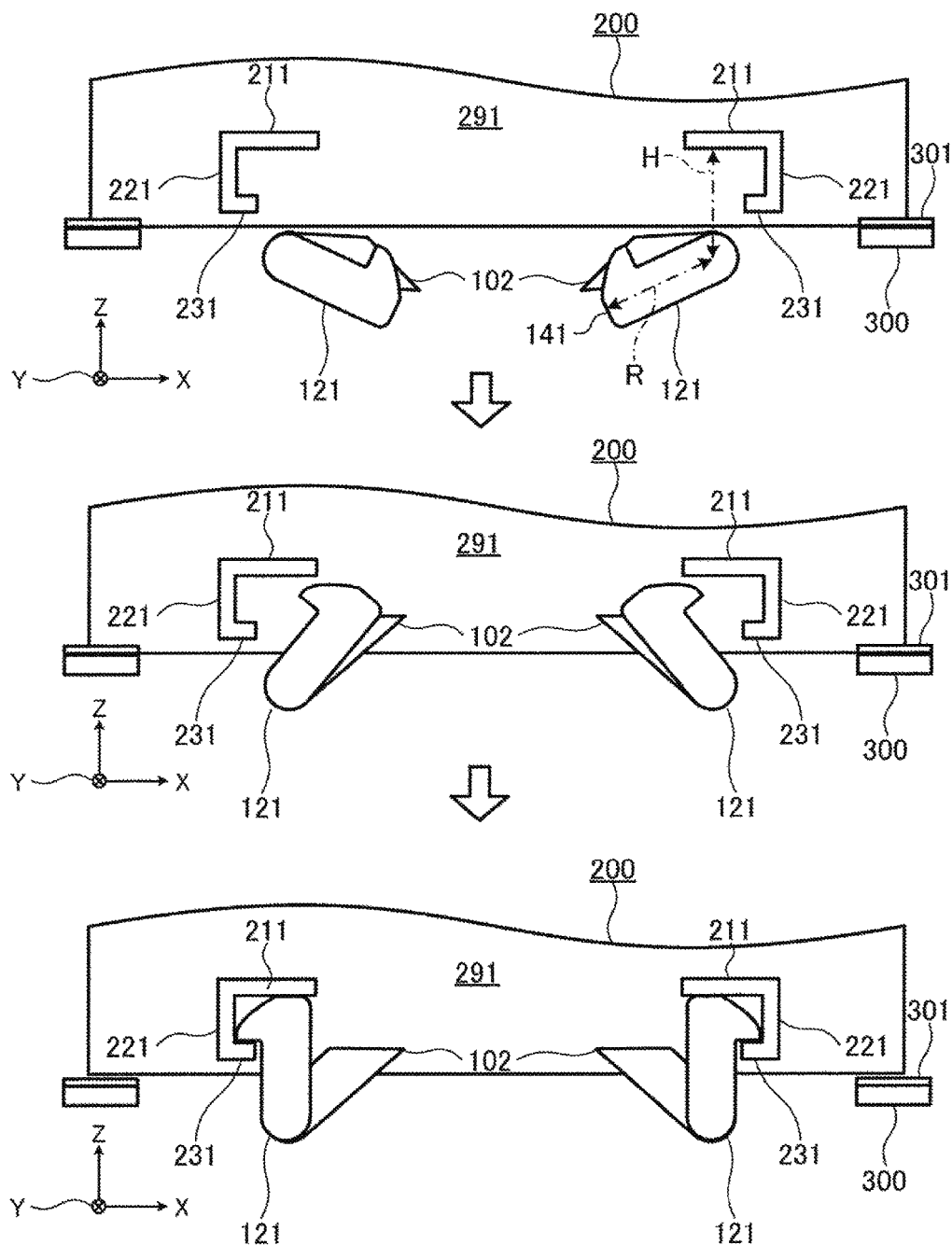
FIG. 11 is a view illustrating an operation of the transfer device in stages.

FIG. 11 is a view illustrating an operation of the transfer device in stages.

As illustrated in an upper stage in FIG. 11, the first engaging members 121 and the second engaging members 122 are disposed, by the rotation driver 103, at a retracted position which is a position below the article 200 where the first engaging members 121 and the second engaging members 122 do not interfere with the article 200. In this state, the first engaging members 121, the second engaging members 122, and the contact members 102 can be made to pass below the article 200.

Next, as illustrated in a middle stage in FIG. 11, the rotation driver 103 rotates the engaging members 121, 122, and rotates the contact members 102 interlocking with the rotation of the engaging members 121, 122. The stop unit 106 stops the rotation of the contact members 102 in a protruding state where the horizontal portion 120 of the contact member 102 is horizontal. In such a state, the contact members 102 is able to be brought into contact with the first surface portion 291 of the article 200.

Next, the transfer driver 104 makes the contact members 102 slide in the transfer direction together with the engaging members 121, 122. By making the contact members 102 slide, the contact members 102 are brought into contact with the first surface portion 291 of the article 200 held on the first holding section 300. In the transfer driver 104, by taking into account a displacement of the article 200 held on the first holding section 300, an amount of movement of the contact members 102 is set so as to allow the contact members 102 to be brought into contact with the first surface portion 291 even when an estimated maximum displacement occurs in the article 200. With such setting, the contact members 102 are reliably brought into contact with the first surface portion 291. When a displacement amount of the article 200 is small, the contact members 102 are brought into contact with the first surface portion 291 at an early stage. However, an impact which may occur in such a case is absorbed by the urging members 107 so that driving of the transfer driver 104 which is performed after the contact members 102 are brought into contact with the first surface portion 291 is absorbed by the urging members 107.

By performing the above-mentioned operations, positioning of the engaging members 121, 122 and the engagement receiving portions of the article 200 is able to be reliably performed.

Then, the rotation driver 103 rotates the engaging members 121 in the protruding direction. In such a state, the contact member 102 is present between the engaging member 121 and the first surface portion 291. Accordingly, there is no possibility that the engaging member 121 is rubbed against the first surface portion 291 so that the generation of dust and the occurrence of damage to the first surface portion 291 is significantly reduced or prevented.

The rotation driver 103 rotates the first engaging members 121 and the second engaging members 122 symmetrically. With such rotation, the first inclined portion 171 is brought into contact with the first jaw portion 211 and, at the same time, the second inclined portion 172 is brought into contact with the second jaw portion 212. Further, when the first engaging member 121 and the second engaging member 122 are rotated, the first inclined portion 171 gradually pushes up the first jaw portion 211 and, at the same time, the second inclined portion 172 gradually pushes up the second jaw portion 212.

By performing the above-mentioned operations, the first surface portion 291 side of the article 200 is gradually lifted. The first engaging member 121 and the second engaging member 122 are rubbed against the jaw portions while rotating in the opposite directions and hence, it is possible to lift the article 200 without displacing the first surface portion 291 side of the article 200 in the width direction.

Next, when the rotation driver 103 further rotates the first engaging members 121 and the second engaging members 122, as illustrated in a lower stage in FIG. 11, the first push-up portion 141 and the first jaw portion 211 are brought into contact with each other, and the second push-up portion 142 and the second jaw portion 212 are brought into contact with each other.

In such a state, the first surface portion 291 side of the article 200 is lifted to a position higher than that of the stoppers 301.

The first pressing portion 151 presses the first wall portion 221 toward the outside in the width direction of the article 200 (the positive direction in the X axis direction in the drawing), and the second pressing portion 152 presses the second wall portion 222 toward the outside in the width direction of the article 200 (the negative direction in the X axis direction in the drawing). Accordingly, it is possible to perform the centering of the article 200 so that the displacement of the article 200 in the width direction is eliminated.

The first regulation receiving portion 161 is brought into contact with or substantially brought into contact with the first regulating portion 231, and the second regulation receiving portion 162 is also brought into contact with or substantially brought into contact with the second regulating portion 232. Accordingly, there is no possibility that the first surface portion 291 side of the article 200 is further raised and hence, it is possible to significantly reduce or prevent rattling of the article 200 in the vertical direction when the article 200 is transferred.

The first surface portion 291 side of the article 200 is held in a fixed state by the first engaging member 121 and the second engaging member 122 and hence, the article 200 is able to be prevented from falling off from the first engaging member 121 and second engaging member 122.

The relationship of the engaging member 121 with the jaw portion 211, the wall portion 221 and the regulating portion 231 is also established with respect to the article 200 held on the third holding section 303.

In the above-mentioned state, the transfer driver 104 moves the first engaging members 121, the second engaging members 122 and the contact members 102 in the transfer direction (Y axis direction in the drawing). By moving these members in this manner, the first engaging member 121 and the second engaging member 122 are engaged with the first engagement receiving portion 201 and the second engagement receiving portion 202, or with the first surface portion 291 so that the article 200 is able to be moved in the transfer direction while making the article 200 slide.

With the above-mentioned operations, the first surface portion 291 side of the article 200 is disposed at a position higher than the stoppers 301 and hence, there is no possibility that the movement of the article 200 is obstructed by the stoppers 301. Further, the article 200 is inclined as a whole and hence, a contact area between the first holding section 300 and the article 200 is reduced. Accordingly, friction resistance generated at the time of transferring the article 200 is able to be reduced.

Next, after the movement of the article 200 is finished, the engaging member and the contact members are rotated to the retracted position illustrated in the upper stage in FIG. 11. By returning the members to such a position, the first surface portion 291 side of the article 200 is able to be slowly lowered to the second holding section 101. Accordingly, it is possible to prevent an impact from being inadvertently applied to the article 200.

Figure 9:
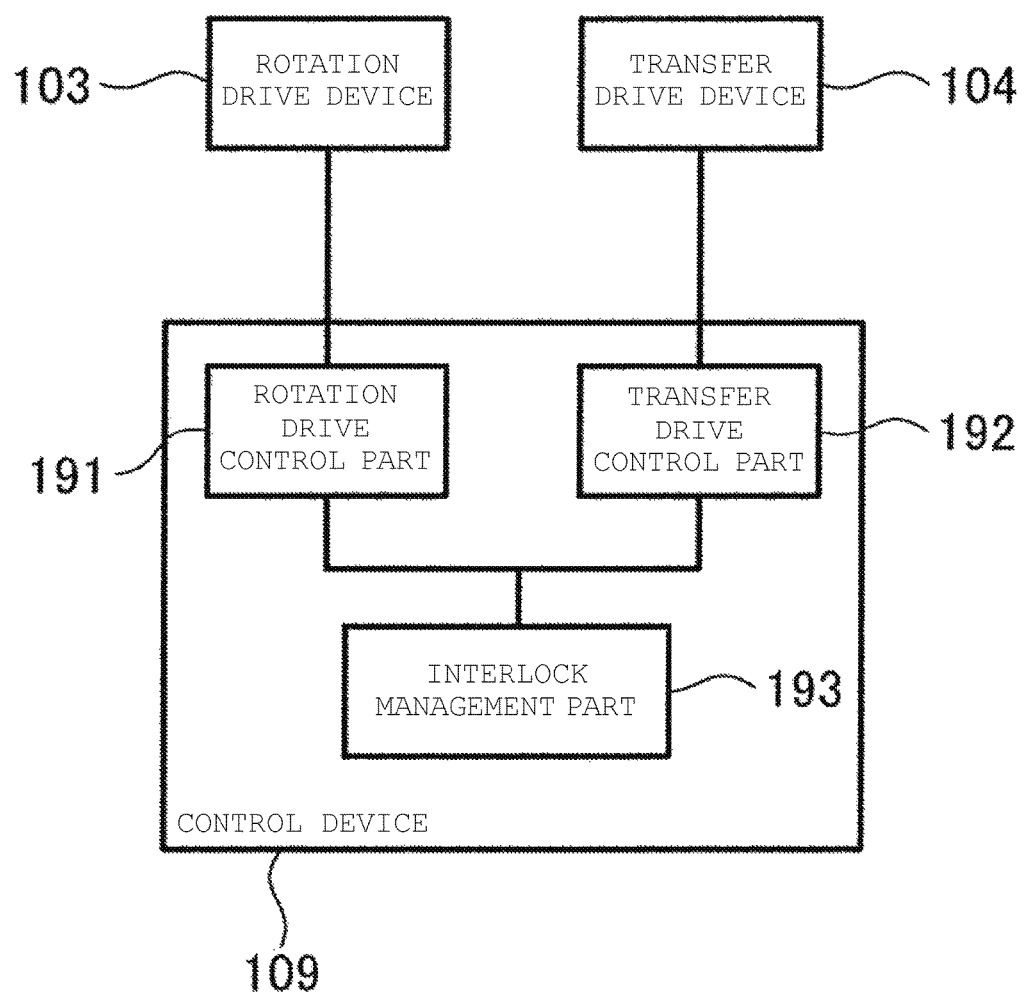
FIG. 9 is a block diagram illustrating functions of a controller.

FIG. 9 is a block diagram illustrating functions of the controller. In the description made hereinafter, there may be a case where the engaging members 121, 122 and the contact members 102 are referred to as transfer members 126.

As illustrated in FIG. 9, the controller 109 is configured or programmed to control the rotation driver 103 and the transfer driver 104, and to include a rotation drive controller 191, a transfer drive controller 192, and an interlock manager 193. The controller 109 generally includes a CPU (Central Processing Unit) and a memory or storage, and provides the respective functions by causing the CPU to execute a program stored in the memory or storage.

The rotation drive controller 191 is a processor or processing circuit which controls the rotation driver 103 so as to rotate the transfer members 126 about the axis of rotation 131. The rotation drive controller 191 moves the transfer members 126 to at least three positions, that is, a retracted position where the transfer member 126 does not interfere with the article 200, a contact position where the transfer member 126 interferes with the first surface portion 291 but does not interfere with the engagement receiving portion 201, and an engaging position where the transfer member 126 engages with the engagement receiving portion 201. In the case of this preferred embodiment, a plurality of (four) transfer members 126 are connected to one rotation driver 103, and the rotation drive controller 191 controls the movement of all transfer members 126 connected to the rotation driver 103 simultaneously.

The rotation drive controller 191 may control the rotation driver 103 based on information on rotational positions transmitted from a rotational position detector such as an encoder provided to the rotation driver 103.

The transfer drive controller 192 is a processor or processing circuit which controls the transfer driver 104 such that the transfer members 126 are linearly moved along the transfer direction, and are stopped at a predetermined position. In the case of this preferred embodiment, for example, the transfer drive controller 192 controls the transfer driver 104 such that the transfer members 126 can be stopped at a position where the transfer member 126 is engaged with the engagement receiving portion 201 of the article 200 held on the first holding section 300, a position where the article 200 transferred from the first holding section 300 is held on the second holding section 101, a preparation position where the transfer member 126 is disposed so as to transfer the article 200 held on the second holding section 101 to the third holding section 303, a position where the transfer member 126 is engaged with the engagement receiving portion 201 so as to transfer the article 200 held on the second holding section 101 to the third holding section 303, and a position where the article 200 transferred from the second holding section 101 is held on the third holding section 303.

In this preferred embodiment, a plurality of (two) transfer members 126 are connected to the rotation driver 103 in a state where the transfer members 126 are spaced away from each other in the transfer direction. These transfer members 126 are moved by the transfer driver 104 integrally with the rotation driver 103. Accordingly, the transfer drive controller 192 controls a stopping position of the transfer members 126 by taking into account the positional relationships between these transfer members 126.

The transfer drive controller 192 may control the transfer driver 104 based on information on transfer positions transmitted from a transfer position detector such as an encoder provided to the transfer driver 104.

The interlock manager 193 is a processor or processing circuit which manages the relationship between the rotation of the transfer members 126 and the movement of the transfer members 126 in the transfer direction by adjusting the rotation drive controller 191 and the transfer drive controller 192. For example, the interlock manager 193 performs management such as, when the transfer members 126 are at the retracted position, the transfer members 126 are moved from one end portion to the other end portion of the transfer device in the transfer direction.

Next, the description is made with respect to the operation of the transfer device 100 when the article 200 held on the third holding section 303 is transferred to the second holding section 101 and, further, is transferred to the first holding section 300.

Figure 12:
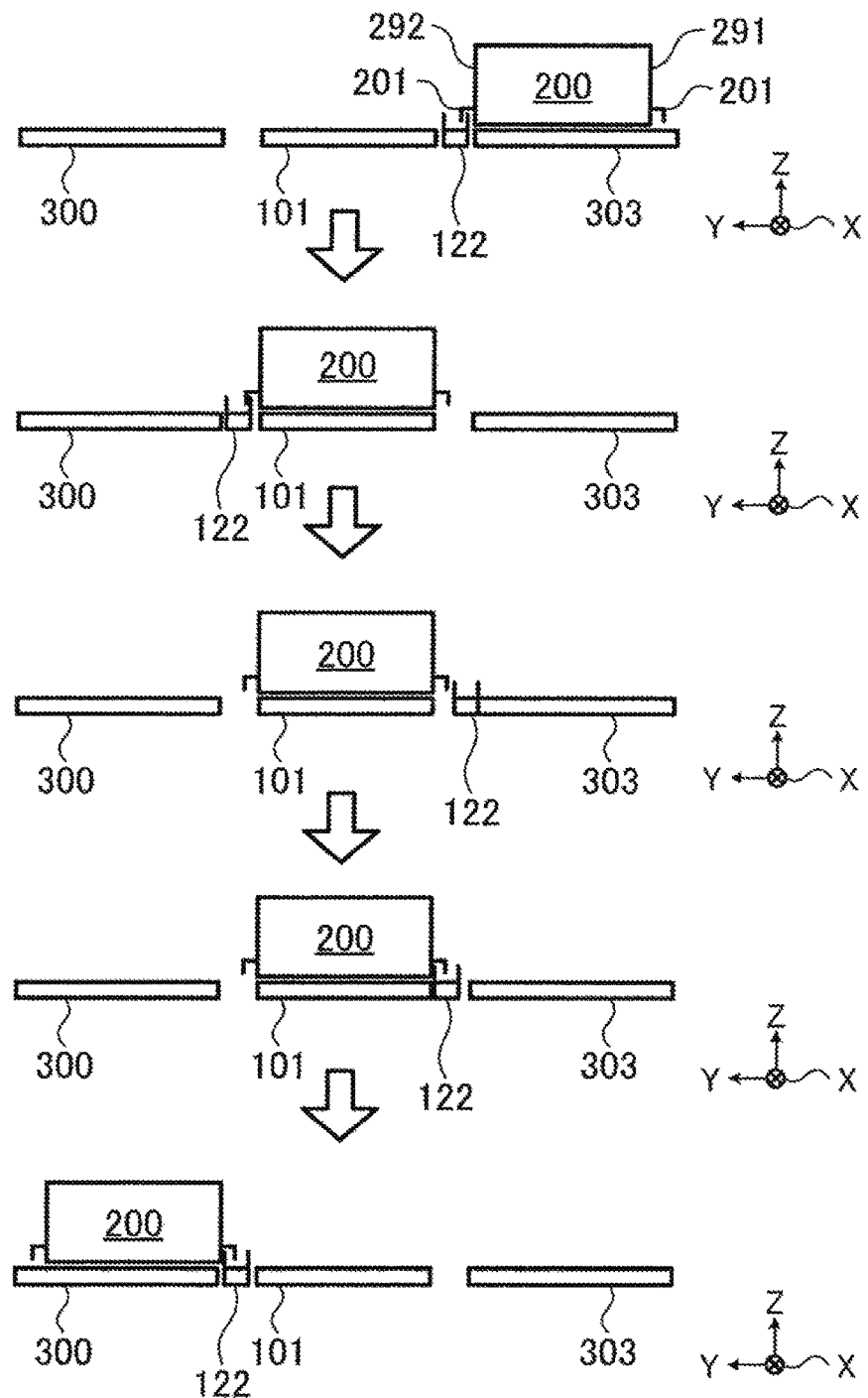
FIG. 12 is a view illustrating movement of a transfer member in a transfer direction in stages.

FIG. 12 is a view illustrating the movement of the transfer member in the transfer direction in stages.

First, as illustrated in the uppermost stage in FIG. 12, the interlock manager 193 of the transfer device 100 disposes, with respect to the article 200 held on the third holding section 303, the transfer member 126 at a position which allows the transfer member 126 to be inserted into a gap between the second surface portion 292 and the engagement receiving portion 201 by controlling the transfer driver 104 through the transfer drive controller 192. Then, the interlock manager 193 rotates the transfer member 126 by controlling the rotation driver 103 through the rotation drive controller 191, thus inserting the transfer member into the gap. This state is substantially the same as the state illustrated in the lower stage in FIG. 11.

Since the illustration relating to the transfer member 126 is small in FIG. 12, both the transfer members 126 and the rotation driver 103 are collectively indicated by reference numeral "126".

Next, as illustrated in a second stage from the top in FIG. 12, the controller 109 transfers the article 200 to the second holding section 101 by moving the transfer member 126.

Then, as illustrated in the upper stage in FIG. 11, the controller 109 rotates the transfer member 126 to the retracted position. In this state, the transfer member 126 and the article 200 do not interfere with each other and hence, the transfer member 126 is able to pass below the article 200.

Subsequently, as illustrated in a third stage in FIG. 12, the controller 109 makes the transfer member 126 in a retracted state to pass below the article 200. Then, the transfer member 126 is disposed at the preparation position which is a position outwardly away from the first surface portion 291 of the article 200 held on the second holding section 101.

For example, at this stage of the operation, there may be a case where the transfer device 100 is moved by a conveyance device (not illustrated) or the like, so that the position of the article 200 on the second holding section 101 is displaced due to vibrations or the like generated when the transfer device 100 is moved. The preparation position is set in the controller 109 by taking into account such a displacement.

Next, the controller 109 controls the rotation driver 103 through the rotation drive controller 191 to make the transfer member 126 protrude to the contact position which is a position illustrated in the middle stage in FIG. 11 where the transfer member 126 is able to be brought into contact with the first surface portion 291 but is not engaged with the engagement receiving portion 201.

Thereafter, as illustrated in a fourth stage in FIG. 12, the controller 109 controls the transfer driver 104 in such a manner that the transfer member 126 is brought into contact with the first surface portion 291. In the case of this preferred embodiment, the contact member 102 which is the transfer member 126 is brought into contact with the first surface portion 291.

Next, in a state where the transfer member 126 is brought into contact with the first surface portion 291, the controller 109 controls the rotation driver 103 so that the transfer member 126 is inserted into a gap between the first surface portion 291 and the engagement receiving portion 201 by controlling.

Next, as the engaging member 121 is rotated in the protruding direction, the first surface portion 291 side of the article 200 is gradually lifted, and is lifted to a position higher than that of the stoppers 301 (not illustrated in FIG. 12).

In the above-mentioned state, the controller 109 moves the transfer member 126 in the direction to the first holding section 300 by controlling the transfer driver 104, thus transferring the article 200 from the second holding section 101 to the first holding section 300 as illustrated in the lowermost stage in FIG. 12.

As described above, by performing the control such that after the transfer member 126 is disposed at the preparation position with respect to the article 200 held on the second holding section 101, the transfer member 126 is brought into contact with the first surface portion 291 side, even when a fine positional control of the transfer driver 104 is not performed, the transfer member 126 is able to be reliably engaged with the engagement receiving portion 201. Accordingly, the article 200 is able to be transferred to the first holding section 300 while the displacement of the article 200 is prevented. Also in the case where the article 200 held on the second holding section 101 is transferred to the third holding section 303, substantially the same advantageous effect are acquired by performing substantially the same control.

Second Preferred Embodiment

Subsequently, another preferred embodiment of the transfer device is described. Elements and portions having substantially the same manner of operation or function, or substantially the same shape, mechanism or structure as the corresponding elements or portions of the first preferred embodiment are given the same reference numerals, and the description of these elements or portions may be omitted. Hereinafter, points which make the second preferred embodiment different from the first preferred embodiment are mainly described, and the description of substantially the same contents may be omitted.

Figure 15:
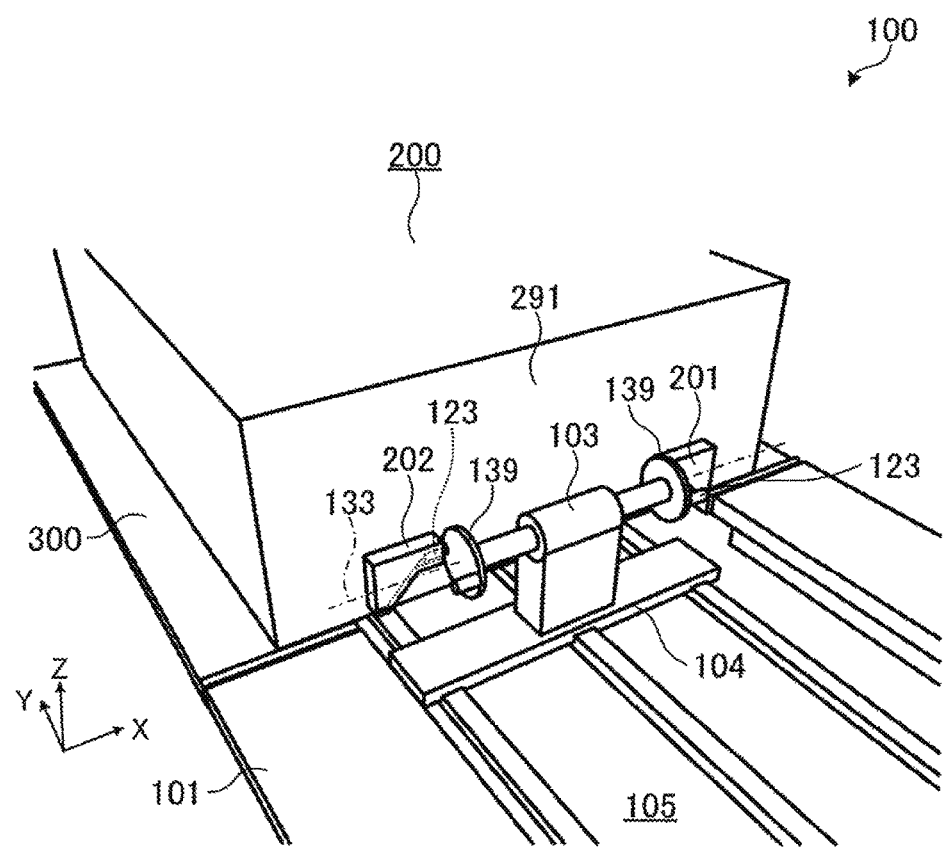
FIG. 15 is a perspective view illustrating a transfer device together with an article and a first holding section.

FIG. 15 is a perspective view illustrating the transfer device together with an article and a first holding section.

Figure 16:
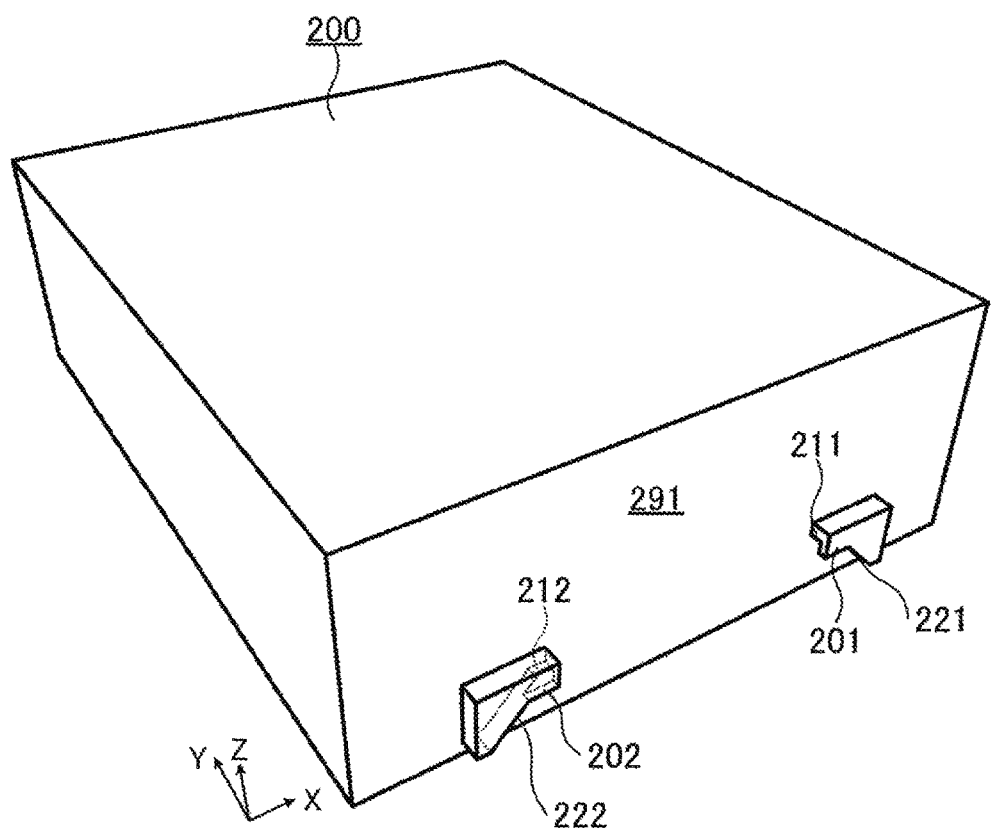
FIG. 16 is a perspective view illustrating the article.

FIG. 16 is a perspective view illustrating the article.

An article 200 includes portions which conform to a transfer device 100 of this second preferred embodiment. The portions which conform to the transfer device 100 include a first engagement receiving portion 201 and a first jaw portion 211, and the first engagement receiving portion 201 and the first jaw portion 211 include a first wall portion 221. The article 200 also includes a second engagement receiving portion 202, a second jaw portion 212, and a second wall portion 222.

The first engagement receiving portion 201 is a portion which engages with a third engaging member 123, to be described later, provided to the transfer device 100 in the transfer direction. The first engagement receiving portion 201 is also a portion to which a force for transferring the article 200 is imparted from the third engaging member 123.

The article 200 also includes a second engagement receiving portion 202 which is disposed in a plane that is symmetrical with the first engagement receiving portion 201, and has substantially the same function as the first engagement receiving portion 201.

The first jaw portion 211 is a portion provided to the article 200 in a state where the first jaw portion 211 protrudes toward the outside from the first surface portion 291 of the article 200. The first jaw portion 211 is a portion which engages with the third engaging member 123 in a vertical direction (Z axis direction in the drawing) and to which a force for pushing up a first surface portion 291 side of the article 200 from the first engaging member 121 is imparted. The first jaw portion 211 includes a plate-shaped portion which protrudes perpendicular or substantially perpendicular to the first surface portion 291 and extends in a width direction (X axis direction in the drawing) of the article 200.

The article 200 also includes a second jaw portion 212 which is disposed in a plane that is symmetrical with the first jaw portion 211 in the same manner as the second engagement receiving portion 202.

The first wall portion 221 is a portion provided to the article 200 in a state where the first wall portion 221 protrudes toward the outside from the first surface portion 291 of the article 200, and is also a portion with which a distal end of the third engaging member 123, to be described later, may be brought into contact. The first wall portion 221 is a portion which protrudes perpendicular or substantially perpendicularly to the first surface portion 291, and includes an inclined surface (curved surface) which approaches the third engaging member 123 as the first wall portion 221 extends to an upper side from a lower side. The article 200 also includes a second wall portion 222 which is disposed in a plane that is symmetrical with the first wall portion 221.

The inclined surface (curved surface) of the first wall portion 221 and the inclined surface (curved surface) of the second wall portion 222 are respectively brought into contact with and slid on two third engaging members 123 which protrude in directions opposite to each other along the width direction (X axis direction in the drawing) of the article 200. Accordingly, centering of the article 200 is able to be performed.

Next, the transfer device 100 is described.

The transfer device 100 includes a second holding section 101 and the third engaging member 123.

The third engaging member 123 is inserted between the first surface portion 291 of the article 200 and the first engagement receiving portion 201 due to rotation thereof about a third axis of rotation 133 along a width direction (X axis direction in the drawing) of the article at a position spaced away from the third axis of rotation 133. The third engaging member 123 is a member which imparts a force to transfer the article 200 to the first engagement receiving portion 201. The third engaging member 123 pushes up the first jaw portion 211.

More specifically, the third engaging member 123 is a member having a rod shape (pillar shape) which is mounted on a peripheral edge portion of a disc 139 connected to the rotation driver 103, and is mounted on the disc 139 in a state where the third engaging member 123 protrudes from the disc 139 along the third axis of rotation 133.

In the case of this preferred embodiment, the third engaging member 123 is illustrated as a round-rod shaped member. Further, two third engaging members 123 are mounted on the disc 139. The transfer device 100 includes two discs 139, and the third engaging members 123 disposed in a plane that is symmetrical with each other are mounted on each disc 139. The two discs 139 are mounted on one rotation driver 103, and the third engaging members 123 disposed in a plane that is symmetrical with each other are rotated simultaneously.

Third Preferred Embodiment

Subsequently, another preferred embodiment of the transfer device is described. Elements or portions having substantially the same manner of operation or function, or substantially the same shape, mechanism or structure as the corresponding elements or portions in the first preferred embodiment or the second preferred embodiment are given same reference numerals, and the description of these elements or portions may be omitted. Hereinafter, points which make the third preferred embodiment different from the first preferred embodiment are mainly described, and the description of the same contents may be omitted.

Figure 17:
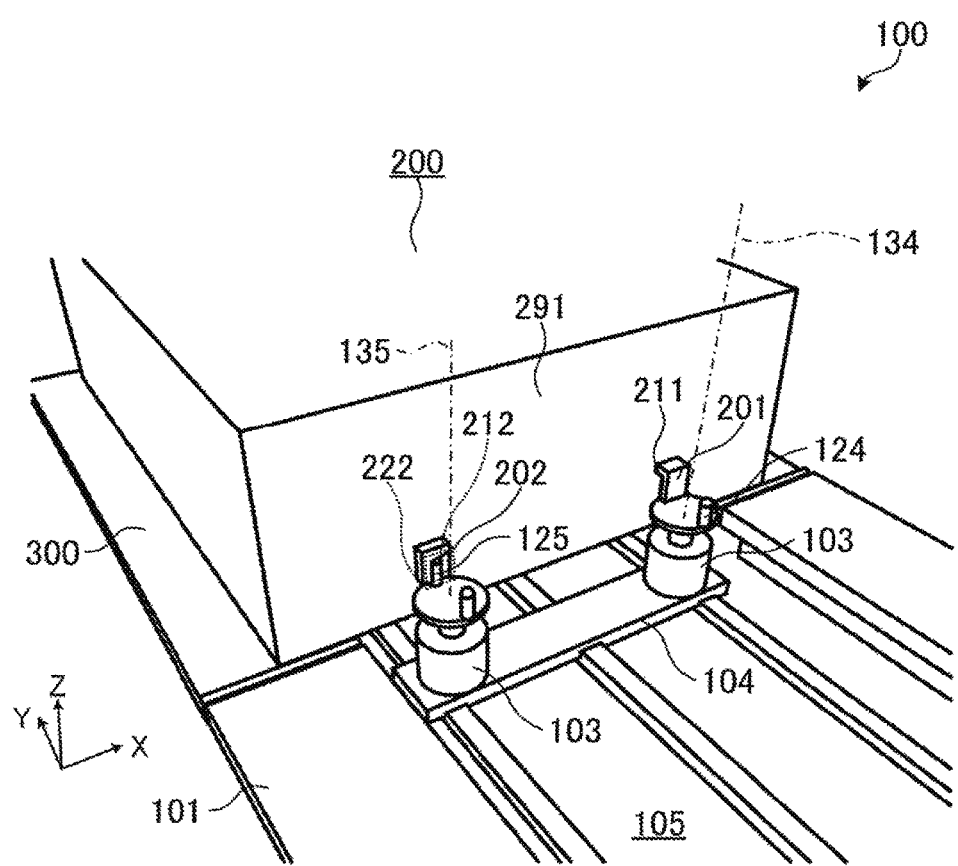
FIG. 17 is a perspective view illustrating a transfer device together with an article and a first holding section.

FIG. 17 is a perspective view illustrating a transfer device together with an article and a first holding section.

Figure 18:
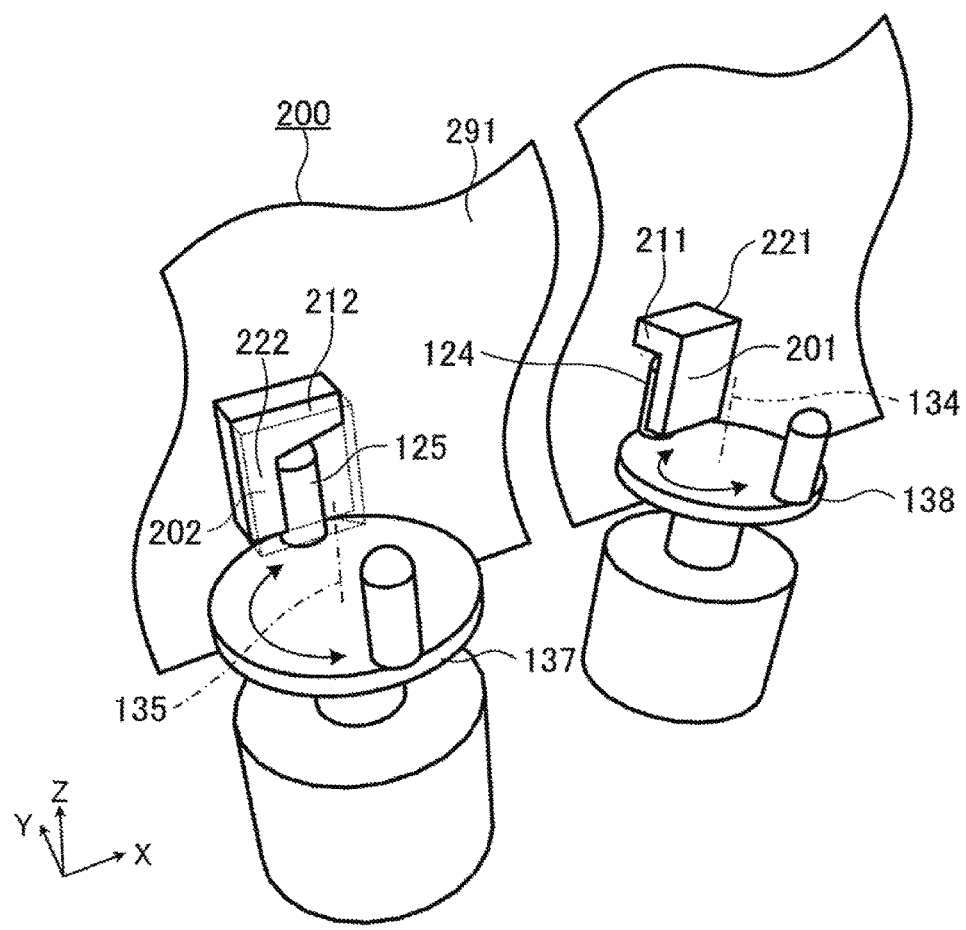
FIG. 18 is a perspective view illustrating an area in a vicinity of an engagement receiving portion of an article.

FIG. 18 is a perspective view illustrating an area in the vicinity of an engagement receiving portion of an article.

An article 200 includes portions which conform to the transfer device 100 of this third preferred embodiment. The portions which conform to the transfer device 100 include a first engagement receiving portion 201 and a first jaw portion 211, and the first engagement receiving portion 201 and the first jaw portion 211 include a first wall portion 221. The article 200 also includes a second engagement receiving portion 202, a second jaw portion 212, and a second wall portion 222.

The first engagement receiving portion 201 is a portion which engages with a fourth engaging member 124, to be described later, provided to the transfer device 100 in the transfer direction and to which a force for transferring the article 200 from the fourth engaging member 124 is imparted.

The article 200 also includes a second engagement receiving portion 202 which is disposed in a plane that is symmetrical with the first engagement receiving portion 201, and has substantially the same function as the first engagement receiving portion 201. The second engagement receiving portion 202 is a portion which engages with a fifth engaging member 125, to be described later, provided to the transfer device 100 in the transfer direction and to which a force for transferring the article 200 from the fifth engaging member 125 is imparted.

The first jaw portion 211 is a portion provided to the article 200 in a state where the first jaw portion 211 protrudes toward the outside from the first surface portion 291 of the article 200. A lower end surface of the first jaw portion 211 is inclined so as to generate a force for pushing up a first surface portion 291 side of the article 200 by making contact with a distal end of the fourth engaging member 124 while sliding.

The article 200 also includes a second jaw portion 212 which is disposed in a plane that is symmetrical with the first jaw portion 211 in the same manner as the second engagement receiving portion 202.

The first wall portion 221 is a portion provided to the article 200 in a state where the first wall portion 221 protrudes toward the outside from the first surface portion 291 of the article 200, and is also a portion with which a side end surface of the fourth engaging member 124, to be described later, is brought into contact. The first wall portion 221 is a portion which protrudes perpendicular or substantially perpendicularly to the first surface portion 291, and includes a flat surface extending in the vertical direction. The article 200 also includes a second wall portion 222 which is disposed in a plane that is symmetrical with the first wall portion 221.

The first wall portion 221 and the second wall portion 222 are brought into contact with the fourth engaging member 124 and the fifth engaging member 125 in directions opposite to each other along the width direction (X axis direction in the drawing) of the article 200 and hence, the centering of the article 200 is able to be performed.

Next, the transfer device 100 is described.

The transfer device 100 includes a second holding section 101, the fourth engaging member 124 and the fifth engaging member 125.

The fourth engaging member 124 is a member which is inserted between the first surface portion 291 of the article 200 and the first engagement receiving portion 201 due to rotation thereof about a fourth axis of rotation 134 along the vertical direction (Z axis direction in the drawing) at a position spaced away from the fourth axis of rotation 134. The fourth engaging member 124 is a member which imparts a force for transferring the article 200 to the first engagement receiving portion 201. The fourth engaging member 124 pushes up the first jaw portion 211 due to rotation thereof.

More specifically, the fourth engaging member 124 is a member having a rod shape (pillar shape) which is mounted on a peripheral edge portion of a disc 138 connected to the rotation driver 103, and is mounted on the disc 138 in a state where the fourth engaging member 124 protrudes from the disc 138 along the fourth axis of rotation 134.

In the case of this preferred embodiment, the fourth engaging member 124 is illustrated as a round-rod shaped member having a semispherical distal end. Further, two fourth engaging members 124 are mounted on the disc 138. The transfer device 100 also includes another disc 137, and the fifth engaging members 125 are mounted on the disc 137.

The present invention is not limited to the above-mentioned preferred embodiments. For example, the preferred embodiments of the present invention may also include other preferred embodiments such as preferred embodiments obtained by combining elements, portions or features described in this specification in an arbitrary manner and preferred embodiments obtained by excluding some elements, portions or features from the whole constitutional elements. The present invention also includes alternative preferred embodiments obtained by applying various modifications which those who are skilled in the art conceive to the above-mentioned preferred embodiments within the gist of the present invention, that is, without departing from the meanings expressed in the claims.

Figure 13:
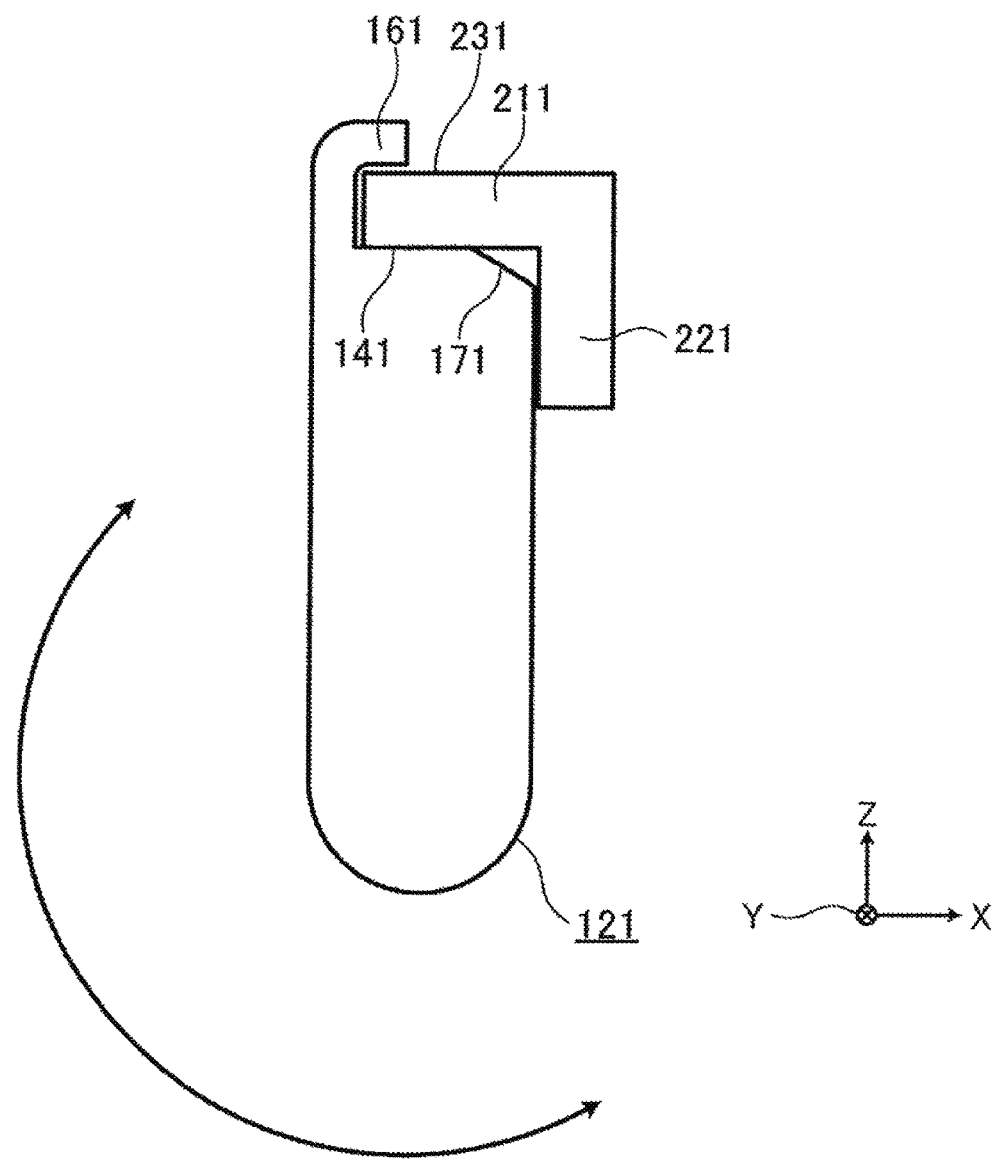
FIG. 13 is a plan view illustrating relationship between a first engaging member and a portion of an article which conforms to a transfer device in another mode in a state where a first engagement receiving portion is omitted.
Figure 14:
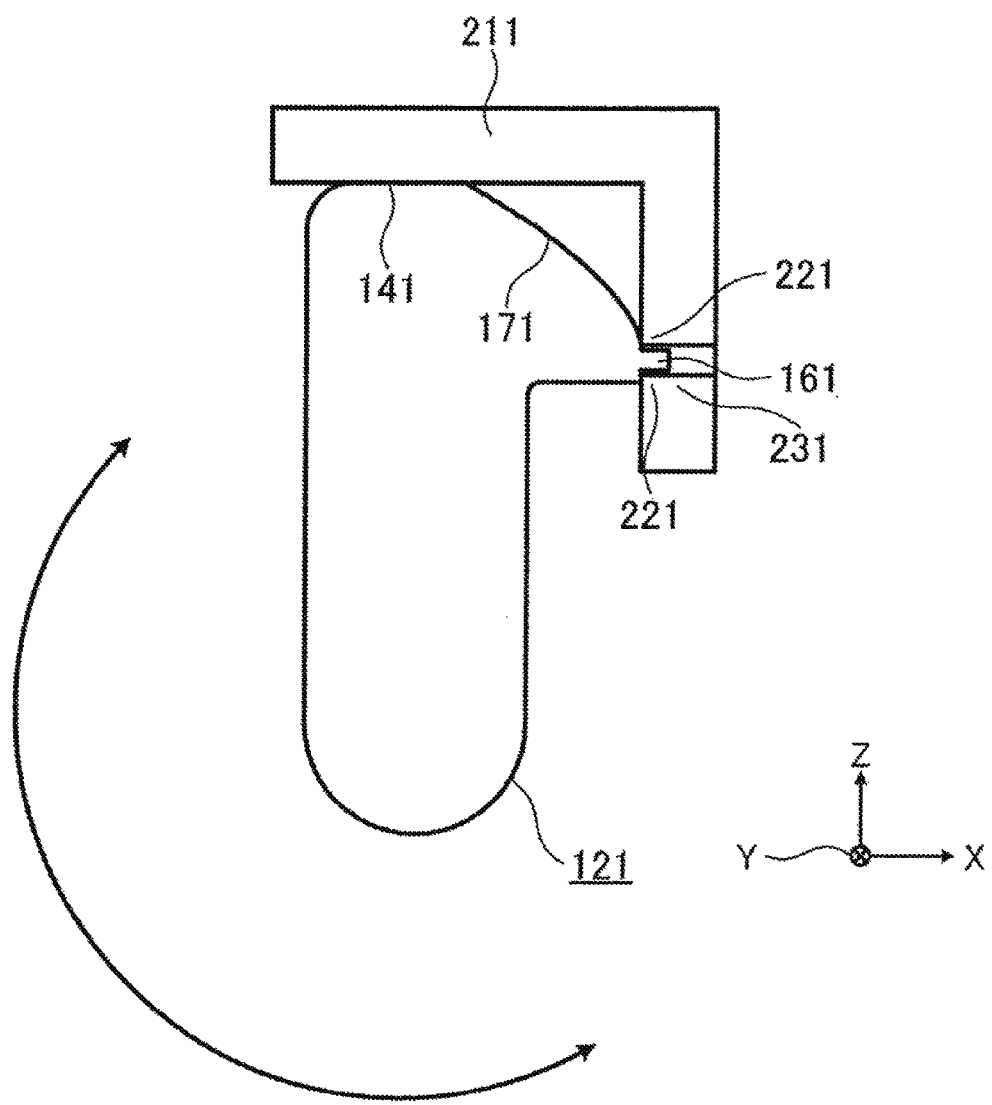
FIG. 14 is a plan view illustrating relationship between a first engaging member and a portion of an article which conforms to a transfer device in another mode in a state where a first engagement receiving portion is omitted.

A shape of the first engaging member 121 is not limited to the previously-mentioned shape. For example, as illustrated in FIG. 13, the first engaging member 121 may have a shape in which the first regulation receiving portion 161 is disposed at a position where the first regulation receiving portion 161 has a larger radius of rotation than the first push-up portion 141. Alternatively, the first engaging member 121 may have a shape illustrated in FIG. 14.

The first wall portion 221 and the second wall portion 222 may be disposed close to each other, or may be formed as an integral body. Further, the first engaging member 121 and the second engaging member 122 may be rotated in such a manner that the first pressing portion 151 and the second pressing portion 152 approach each other at the time of pushing up the first surface portion 291 side. With such a configuration, the centering of the article 200 can be performed in a state where the first wall portion 221 and the second wall portion 222 are sandwiched between the first engaging member 121 and the second engaging member 122. Such a configuration is particularly advantageous when the article 200 has a narrow width.

It is not always necessary to dispose the first engaging member 121 and the second engaging member 122 in symmetry with each other. Even when the first engaging member 121 and the second engaging member 122 are disposed in asymmetry with each other, substantially the same advantageous effects are able to be achieved.

For example, the case where two contact members 102 which are brought into contact with the first surface portion 291 simultaneously is exemplified in the above-mentioned preferred embodiments. However, one contact member 102 may be used.

In the transfer direction, the contact member 102 may be disposed on both sides of one engaging member 121 and the engaging member 121 may be sandwiched by the two contact members 102. With such a configuration, even when the holding section is present on both sides of the transfer device 100, the article 200 is able to be transferred to the holding section on either side using one engaging member 121 and hence, the advantageous effects of the contact member 102 are also able to be achieved.

Although the article 200 is held in a placed or installed state, the article 200 may be held in any desired held state including a suspended state.

The article 200 where the first engaging member 121, the first jaw portion 211 and the like are provided to the first surface portion 291 is exemplified in the above-mentioned preferred embodiments. However, the first engaging member 121, the first jaw portion 211 and the like may be also provided to a second surface portion which is on a plane different from the first surface portion 291 which is on a plane intersecting with the transfer direction.

Preferred embodiments of the present invention are preferably applicable to a transfer device which transfers articles at an automated warehouse or a station which defines a commodity distribution base.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transfer device comprising:
a second holding section to hold an article transferred by sliding the article between the second holding section and a first holding section; wherein
the article includes a first engagement receiving portion disposed in a state where the first engagement receiving portion is located away from a first surface portion on a plane intersecting with a transfer direction toward an outside in the transfer direction by a predetermined distance;
the transfer device further comprises a first engaging member to be inserted between the first engagement receiving portion and the first surface portion of the article due to rotation of the first engaging member about a first axis of rotation along the transfer direction;
the first engaging member includes a first push-up portion disposed at a position where the first push-up portion has a radius of rotation longer than a distance between a lower end portion of a first jaw portion, which is provided to the article in a state where the first jaw portion protrudes toward the outside from the first surface portion, and the first axis of rotation, the first push-up portion being capable of lifting the first surface portion of the article by making contact with the first jaw portion;
the transfer device further comprises a second engaging member to rotate in a direction opposite to the rotation of the first engaging member about a second axis of rotation disposed along the transfer direction;
the first engaging member includes a first pressing portion which is pressed to a side end portion of a first wall portion provided to the article in a state where the first wall portion protrudes toward the outside from the first surface portion in a width direction of the article due to rotation of the first engaging member; and
the second engaging member includes a second pressing portion which is pressed to a side end portion of a second wall portion provided to the article in a state where the second wall portion protrudes toward the outside from the first surface portion in a direction opposite to the first pressing portion in a width direction of the article due to rotation of the second engaging member.

2. A transfer device comprising:
a second holding section to hold an article transferred by sliding the article between the second holding section and a first holding section; wherein
the article includes a first engagement receiving portion disposed in a state where the first engagement receiving portion is located away from a first surface portion on a plane intersecting with a transfer direction toward an outside in the transfer direction by a predetermined distance;
the transfer device further comprises a first engaging member to be inserted between the first engagement receiving portion and the first surface portion of the article due to rotation of the first engaging member about a first axis of rotation along the transfer direction;
the first engaging member includes a first push-up portion disposed at a position where the first push-up portion has a radius of rotation longer than a distance between a lower end portion of a first jaw portion, which is provided to the article in a state where the first jaw portion protrudes toward the outside from the first surface portion, and the first axis of rotation, the first push-up portion being capable of lifting the first surface portion of the article by making contact with the first jaw portion; and
the first engaging member includes a first regulation receiving portion which engages with an upper end portion of a first regulating portion provided to the article in a state where the first regulating portion protrudes toward the outside from the first surface portion and regulates movement of the first surface portion in an upward direction.

3. A transfer device comprising:
a second holding section to hold an article transferred by sliding the article between the second holding section and a first holding section; wherein
the article includes a first engagement receiving portion disposed in a state where the first engagement receiving portion is located away from a first surface portion on a plane intersecting with a transfer direction toward an outside in the transfer direction by a predetermined distance;
the transfer device further comprises a first engaging member to be inserted between the first engagement receiving portion and the first surface portion of the article due to rotation of the first engaging member about a first axis of rotation along the transfer direction;
the first engaging member includes a first push-up portion disposed at a position where the first push-up portion has a radius of rotation longer than a distance between a lower end portion of a first jaw portion, which is provided to the article in a state where the first jaw portion protrudes toward the outside from the first surface portion, and the first axis of rotation, the first push-up portion being capable of lifting the first surface portion of the article by making contact with the first jaw portion; and
the transfer device further comprises a contact member disposed on an article side of the first engaging member, the contact member being capable of rotating interlockingly with an operation of the first engaging member about the first axis of rotation, and to stop between a position below the article and a position where the first engaging member is inserted between the first engagement receiving portion and the first surface portion.

4. The transfer device according to claim 3, further comprising an urging member which urges both the first engaging member and the contact member toward the article side along the first axis of rotation.

5. The transfer device according to claim 3, wherein the contact member includes an upper end edge extending horizontally when the contact member is stopped between the position below the article and the position where the first engaging member is inserted between the first engagement receiving portion and the first surface portion.

6. The transfer device according to claim 3, wherein, in a state where the contact member is stopped, the contact member is pressed to the article so as to further rotate the first engaging member.

7. The transfer device according to claim 3, further comprising an extensible resilient member which connects the first engaging member and the contact member to each other.

8. The transfer device according to claim 3, further comprising a stop unit to stop the contact member which rotates interlockingly with the operation of the first engaging member.

9. A transfer device comprising:
a second holding section to hold an article transferred by sliding the article between the second holding section and a first holding section; wherein
the article includes a first engagement receiving portion disposed in a state where the first engagement receiving portion is located away from a first surface portion on a plane intersecting with a transfer direction toward an outside in the transfer direction by a predetermined distance;
the transfer device further comprises a first engaging member to be inserted between the first engagement receiving portion and the first surface portion of the article due to rotation of the first engaging member about a first axis of rotation along the transfer direction;
the first engaging member includes a first push-up portion disposed at a position where the first push-up portion has a radius of rotation longer than a distance between a lower end portion of a first jaw portion, which is provided to the article in a state where the first jaw portion protrudes toward the outside from the first surface portion, and the first axis of rotation, the first push-up portion being capable of lifting the first surface portion of the article by making contact with the first jaw portion; and
the transfer device further comprises:
a rotation driver to rotatably swing the first engaging member;
a transfer driver to move back and forth the first engaging member in the transfer direction; and
a controller configured or programmed to perform a control in which, in transferring an article held on the second holding section to the first holding section, the first engaging member is disposed at a position spaced away from the first surface portion on a side opposite to the first holding section with respect to the article by controlling the transfer driver, the first engaging member is caused to protrude to a position where the first engaging member is not engaged with the first engagement receiving portion by controlling the rotation driver, and the first engaging member is brought into contact with the first surface portion by controlling the transfer driver.

10. The transfer device according to claim 9, further comprising an urging member to urge the first engaging member toward an article side along the first axis of rotation.

11. The transfer device according to claim 9, further comprising a contact member disposed on an article side of the first engaging member, the contact member being capable of rotating interlockingly with an operation of the first engaging member about the first axis of rotation, and to stop between a position below the article and a position where the first engaging member is inserted between the first engagement receiving portion and the first surface portion.

12. A method of controlling a transfer device which includes a second holding section to hold an article which is transferred by sliding the article between the second holding section and a first holding section, a transfer member to be inserted, due to rotation of the transfer member about an axis of rotation along a transfer direction, between an engagement receiving portion, which is provided to the article in a state where the engagement receiving portion is located away from a first surface portion on a plane intersecting with a transfer direction of the article toward an outside in the transfer direction by a predetermined distance, and the first surface portion, a rotation driver to rotatably swing the transfer member, and a transfer driver to move back and forth the transfer member in the transfer direction, the method comprising the steps of:
transferring the article held on the second holding section to the first holding section by:
arranging the transfer member at a position spaced away from the first surface portion on a side opposite to the first holding section with respect to the article by controlling the transfer driver;
causing the transfer member to protrude to a position where the transfer member is not engaged with the engagement receiving portion by controlling the rotation driver; and
bringing the transfer member into contact with the first surface portion by controlling the transfer driver.

* * * * *